United States Patent
Kawata

[11] Patent Number: 6,076,171
[45] Date of Patent: Jun. 13, 2000

[54] INFORMATION PROCESSING APPARATUS WITH CPU-LOAD-BASED CLOCK FREQUENCY

[75] Inventor: Kaoru Kawata, Tokyo, Japan

[73] Assignee: Mitsubishi Denki Kabushiki Kaisha, Tokyo, Japan

[21] Appl. No.: 09/048,051

[22] Filed: Mar. 26, 1998

[30] Foreign Application Priority Data

Mar. 28, 1997 [JP] Japan ................................ 9-077390

[51] Int. Cl.$^7$ ....................................................... G06F 1/08
[52] U.S. Cl. ........................................ 713/501; 713/322
[58] Field of Search ................... 713/300, 310, 713/320, 322, 323, 601, 501

[56] References Cited

U.S. PATENT DOCUMENTS

| | | | |
|---|---|---|---|
| 5,086,387 | 2/1992 | Arroyo et al. | 713/322 X |
| 5,560,017 | 9/1996 | Barrett et al. | 713/322 X |
| 5,761,517 | 6/1998 | Durham et al. | 713/322 |
| 5,909,585 | 6/1999 | Shinmiya | 713/322 |

*Primary Examiner*—Thomas M. Heckler
*Attorney, Agent, or Firm*—Leydig, Voit & Mayer

[57] ABSTRACT

An information processing apparatus includes a CPU, a memory, and a reference signal generator and operates based on a system clock signal generated by the reference signal generator. The apparatus includes a detection unit for detecting a CPU operational state and a clock control unit for controlling frequency of the system clock signal. The detection unit detects a CPU busy ratio as a CPU operational state indicating the load on the CPU. The clock control unit controls the frequency of the system clock so that the detected CPU busy ratio falls within a permissible range of CPA load.

19 Claims, 16 Drawing Sheets

→ time

→ time

T=T$_{X1}$

→ time

T=T$_{X2}$

→ time duty factor = $\frac{10}{13}$  (76.9%)

| STEP | CPU clock frequency (MHz) | duty factor (%) | (CPU performance level) |
|---|---|---|---|
| 0001 | 33.3 | 10 | (333) |
| 0002 | 33.3 | 20 | (666) |
| 0003 | 33.3 | 30 | (999) |
| 0004 | 33.3 | 40 | (1332) |
| 0005 | 33.3 | 50 | (1665) |
| 0006 | 33.3 | 60 | (1998) |
| 0007 | 33.3 | 70 | (2331) |
| 0008 | 33.3 | 80 | (2664) |
| 0009 | 33.3 | 90 | (2997) |
| 0010 | 33.3 | 100 | (3330) |
| 0011 | 40 | 90 | (3600) |
| 0012 | 40 | 100 | (4000) |
| 0013 | 50 | 90 | (4500) |
| 0014 | 50 | 100 | (5000) |
| 0015 | 66.6 | 80 | (5328) |
| 0016 | 66.6 | 90 | (5994) |
| 0017 | 66.6 | 100 | (6660) |

| duty factor | CPU clock frequency | (CPU performance level) |
|---|---|---|
| 10% | 33.3MHz | 333 |
| 100% | 33.3MHz | 3330 |
| 83.5% | 40MHz | 3330 |
| 100% | 40MHz | 4000 |
| 80% | 50MHz | 4000 |
| 100% | 50MHz | 5000 |
| 75.1% | 66.6MHz | 5000 |
| 100% | 66.6MHz | 6660 |

INFORMATION PROCESSING APPARATUS WITH CPU-LOAD-BASED CLOCK FREQUENCY

BACKGROUND OF THE INVENTION

The present invention relates to an information processing apparatus, such as a portable computer, capable of controlling the power consumption by varying the system clock frequency or the like.

In recent years, with the emergence of multifunctional operating systems typified by Microsoft Windows or high-performance CPUs (Central Processing Units) typified by the Intel Pentium Processor, the field of personal computers has also attained a major improvement in their processing functions. Meanwhile, because the power consumption of the computer system tends to increase, efforts have been being made for reduction in power consumption by means of improvement in the IC process or the like. Under the demand for further functional improvement, these means for reducing the power consumption act as effective means, contributing to the reduction in power consumption per unit function, but, in many cases, not attaining a reduction in total value of the power that the CPU consumes. Also, because the time at which the CPU equipped with low power consumption measures is released into the market is delayed from that of non-low power consumption CPUs, portable information equipment (e.g., notebook personal computers), which is generally adopted to use battery drive and whose power consumption need to be low, is forced to use one- or two-previous generation CPUs of low power consumption versions, tending to result in insufficient functions as a system. Under these circumstances, there have been proposed some methods of reducing the power consumption of computer systems.

One known method for reducing the power consumption of computer systems is to lower the CPU clock frequency. As has conventionally been adopted in many laptop or notebook computers, this method is designed to enable the user to select a CPU clock frequency through exclusive key input or the like in the initial state or on the way of use, where selecting a low CPU clock frequency allows the ability of the whole computer system to lower, to thereby attain a reduction in the power consumption. More specifically, for example, operating a 90 MHz clock capable CPU at a 50 MHz clock reduces the power consumption by about one half.

Also, as a conventional power consumption saving function of computer systems, there has been proposed a method of reducing the power consumption of a CPU by detecting occurrence of an event (occurrence of a key input) such as execution of a key sense routine, that the user has performed directly on the computer system, and by shifting the CPU clock frequency to a certain low state, for example, as disclosed in Japanese Patent Laid-Open Publication HEI 7-219670 which is incorporated herein by reference.

The method as described in Japanese Patent Laid-Open Publication HEI 7-219670 is purposed to provide a function of reducing the power consumption of the system without impairing its user friendliness by lowering the system ability during the execution of a key sense routine that involves no high CPU power.

Out of the two conventional methods for reducing the power consumption of computer systems, the former one is intended to restrict the CPU power and reduce the power consumption by lowering the CPU clock frequency. However, restricting the CPU power itself would cause the ability of the computer system to be lowered as well, which can be regarded as essentially equivalent to using one- or two-generation previous CPUs of low power consumption. Furthermore, the method disables the maximum specification abilities inherent in the CPU, which would cause the user discomfort.

The latter method, on the other hand, is intended to reduce the power consumption by lowering the CPU clock frequency only during the execution of the key sense routine that involves no particularly high CPU power, thus having a function of preventing the user from feeling discomfort. However, during the time other than the execution of the key sense routine, this power consumption reduction function will not work. Even during a time period in which no high CPU power is involved, other than the execution of the key sense routine, for example, a time period in which the user thinks about input sentences while using word processor software, the CPU power will not lower, so that wasteful power is consumed in such time periods.

Further, when the value of the CPU clock frequency to be lowered during the execution of the key sense routine is set to a relatively high frequency with a preference for the prevention of user's discomfort, the power consumption reduction effect would lower. Conversely, when the value is set to a relatively low frequency with a preference for the power consumption reduction effect, there is a possibility of causing the user discomfort. Due to the fact that the speed or frequency of key input differs depending on the user and the working contents involved, it is difficult to uniformly set the value of CPU clock frequency to be lowered.

SUMMARY OF THE INVENTION

The present invention having been accomplished to solve the above problems,.an object of the invention is to provide an information processing apparatus, such as a computer system, which is capable of reliably realizing a reduction in power consumption while preventing situations that the user undergoes discomfort due to a lowered CPU power.

According to a first aspect of the invention we provide a information processing apparatus which has a CPU, a memory and a reference signal generator and which operates based on a system clock signal generated by said reference signal generator, said information processing apparatus comprising:

detection means for detecting a CPU operational state which indicates a load imposed on the CPU; and clock control means for controlling frequency of said system clock signal so that said CPU operational state detected by said detection means falls within a reference range which is predetermined as a proper CPU load range.

With the above information processing apparatus according to the first aspect of the invention, a CPU power currently required by the user is detected directly by the detection means and, based on the detection result, the system clock frequency dynamically changes so that the CPU power offered falls within a predetermined proper range. Therefore, the CPU power can be adjusted without causing the user discomfort such as insufficiency of CPU power. Accordingly, as the quantity of task (CPU power) decreases, power consumption of the computer system can be arranged without causing the user discomfort. Still, since the required CPU power is detected directly, there is no need of being conscious of CPU power adjustment responsive to differences among individuals of users or to the contents of the task. Also, when the user needs a high CPU power, the CPU power needed by the user can be offered under the condition that the CPU specification power is a maximum power, so that the system function is never impaired. In such a case, also with respect to the range expressed as the high CPU power, if the CPU power required by the user is below the CPU specification power, the CPU power can be lowered to an extent corresponding to the difference and, thus, power consumption can be reduced as well.

According to a second aspect of the invention, based on the first aspect of the invention, we provide a information processing apparatus wherein said detection means detects a CPU busy ratio which is defined as a ratio of a sum Tb of time periods during which the CPU is in the busy state during a predetermined reference time length to the reference time length T, namely Tb/Ta; said CPU busy ratio denoting a CPU operational state which indicates a load imposed on the CPU; and said proper CPU load range is obtained by specifying a range of said CPU busy ratio Tb/T.

With the above information processing apparatus according to the second aspect of the invention, the CPU busy ratio Tb/T is detected by the detection means and, based on the detection result, the system clock frequency is dynamically changed so that the CPU busy ratio falls within a proper range corresponding to a prescribed proper range of CPU power. Thus, the CPU power can be adjusted so that power consumption can be reduced, without causing the user discomfort such as insufficiency of CPU power.

According to a third aspect of the invention we provide a information processing apparatus which has a CPU, a memory and a reference signal generator and which operates based on a system clock signal generated by said reference signal generator, said information processing apparatus comprising:

detection means for detecting a CPU busy ratio which is defined as a ratio of a sum Tb of time periods during which the CPU is in the busy state during a predetermined reference time length to the reference time length T, namely Tb/Ta; said CPU busy ratio denoting a CPU operational state which indicates a load imposed on the CPU;

clock control means for controlling a CPU clock signal derived from said system clock signal so that the busy ratio Tb/T detected by said detection means falls within a permissible range which is predetermined as a range of a proper CPU load; and said clock control means comprising:

frequency control means for selecting among a plurality of different predetermined frequencies and for setting the frequency of said CPU to be a selected frequency, duty factor control means for selecting among a plurality of predetermined duty factors and for setting the duty factor of said CPU to be a selected duty factor, said CPU clock signal having a time period during which no pulse exists, where the duty factor is defined as a ratio of a sum of time periods during which a pulse exists during a predetermined unit time to said unit time storage means for storing a table in which each element corresponding to each of different pairs of a frequency and a duty factor of said CPU is registered in the order of increasing or decreasing CPU performance level which is defined as a product of the frequency and the duty factor of said CPU, and decision means for deciding whether or not the busy ratio detected by said detection means is within said permissible range; and said frequency control means and said duty factor control means cooperatively changing one step of the frequency and the duty factor of said CPU corresponding to a transition between adjacent elements in said table with the decision being done by said decision means, thereby the busy ratio Tb/T being shifted into said permissible range.

With the above information processing apparatus according to the third aspect of the invention, the CPU busy ratio is detected by the detection means in order to look into a CPU power currently required by the user and, based on the detection result, the system clock frequency and the duty factor dynamically changes according to the table in which various elements corresponding to various types of combinations of CPU clock frequency and duty factor are registered in an order of CPU performance level, so that the CPU busy ratio falls within a permissible range corresponding to a prescribed proper range of CPU power. As a result, the CPU power can be adjusted without cause the user discomfort such as insufficiency in CPU power.

According to a fourth aspect of the invention, based on the third aspect of the invention, we provide a information processing apparatus wherein said clock control means is capable of setting said frequency control means and said duty factor control means to change the frequency and the duty factor of said CPU by plural steps of the frequency and the duty factor which correspond to plural transitions between adjacent elements in said table.

With the above information processing apparatus according to the fourth aspect of the invention, the CPU clock frequency and the duty factor are changed by a plurality of steps (corresponding to a plurality of times of shift between adjacent elements in the foregoing table) while it is decided whether or not the busy ratio Tb/T falls within a specified permissible range, by which the CPU busy ratio Tb/T can be shifted to within the specified permissible range. Therefore, the CPU power can be shifted to the proper range efficiently by increasing the unit variation of CPU performance level as required. Thus, the process of power consumption control, i.e., adjusting the CPU power and reducing the power consumption, can be carried out efficiently without cause the user discomfort.

According to a fifth aspect of the invention, based on the third aspect of the invention, we provide a information processing apparatus wherein when plural pairs of CPU clock frequency and duty factor are present as a pair that gives the same CPU performance level, said table includes as an element a pair of the frequency and the duty factor which corresponds to the lowest or relatively low frequency among the plural frequencies of said plural pairs.

With the above information processing apparatus according to the fifth aspect of the invention, when a plurality of combinations of CPU clock frequency and duty factor are present as the combination that gives the same CPU performance level, a combination having the lowermost or relatively low CPU clock frequency is selected out of the plurality of combinations as an element of the table that is looked up to for changing the CPU clock frequency and the duty factor. This means that a combination of a CPU clock frequency and a duty factor that can suppress the maximum discharge current amount of the battery of the information processing apparatus is preferentially selected as the element of the table. Accordingly, the CPU busy ratio can be set within the permissible range by changing the CPU clock frequency and the duty factor so that the maximum discharge current amount of the battery of the information processing apparatus does not become large. Thus, the battery life can be prolonged and the information processing apparatus can be driven for a prolonged time with the battery.

Other features and advantages of the present invention will become apparent from the following description of the invention which refers to the accompanying drawings.

DETAILED DESCRIPTION OF THE PREFERRED EMBODIMENTS

Basic Principle

Before the description of embodiments of the present invention proceeds, the basic principle of the present invention that forms the basis of the operation of the embodiments will be described below.

The present invention is designed to provide a proper CPU power by detecting the CPU busy ratio in a computer system, by checking the CPU power needed for the current task the user of the computer system is engaged in against the maximum specification ability of the CPU, and then by controlling the system clock frequency or the like in response to the needed CPU power. This is intended to prevent the user from feeling discomfort as well as to reduce the power consumption.

It is noted here that the user's current task and the CPU power required by the task refer to, for example, not limitatively a task and a CPU power that the user requires directly on the computer system like a key input operation, but those tasks to be indirectly grasped, as viewed from the user, including a task of booting up system software, access to storage devices involved in file handling and the like.

<0.1 CPU Busy Ratio and Proper CPU Power>

Figure 1:
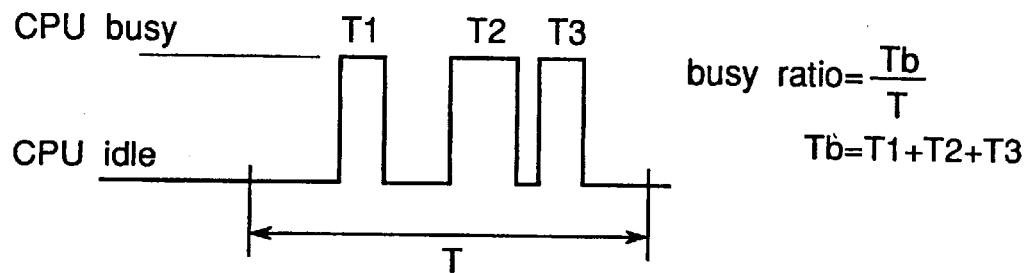
FIG. 1 is a diagram for illustrating the definition of the CPU busy ratio.

FIG. 1 is a diagram showing changes in the CPU operational state during one reference time length of T, where the CPU busy ratio, which means an average operational state during the CPU reference time length T, can be defined by the ratio of a sum of time periods during which the CPU is in the busy state, $Tb=T1+T2+T3$, to the reference time length T, i.e., $Tb/T$.

The CPU busy ratio, which is given by a result of detecting the actual CPU operational state, serves as an index that directly shows the required CPU power regardless of the type of the user's task. More specifically, a large CPU busy ratio corresponds to a high CPU operating ratio, showing that the current CPU power causes a large load to be imposed on the CPU. Conversely, a small CPU busy ratio corresponds to a low CPU operating ratio, showing that the current task are only a small load for the current CPU power.

In the former case, enhancing the CPU power allows the CPU operating ratio to be reduced, which change is recognized by the user as a move to a comfortable operational state of the computer system. In the latter case, on the other hand, because of a low CPU operating ratio even at the currently offered CPU power, the CPU power can be further lowered. When this is done, the CPU power should be lowered within such a range that the CPU operating ratio (CPU busy ratio) will not be too high, in order that the CPU power can be controlled while a comfortable operational state of the computer system is continued to be offered to the user.

Accordingly, the CPU busy ratio gives an average operational state of the CPU during the reference time length T, while the CPU busy ratio can also be used as an index that shows the comfortableness of the operational state of the computer system, as viewed from the user. More specifically, the minimum CPU power that will not cause the user any discomfort can be defined by previously determining the relationship between CPU operating ratio or CPU busy ratio and user's comfortable operational range at any CPU power level.

Figure 2:
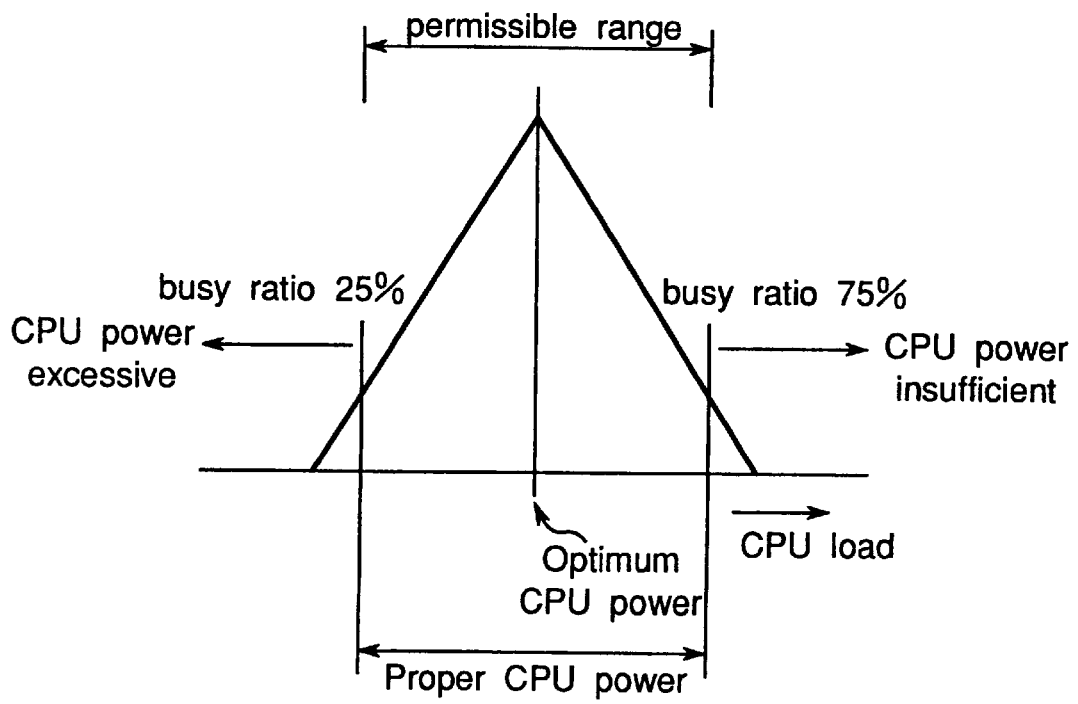
FIG. 2 is a diagram showing the basic concept of CPU power control based on the CPU busy ratio.

FIG. 2 is a diagram showing the basic concept on which the CPU power is changed with an index of the CPU busy ratio defined as shown in FIG. 1. As shown in FIG. 2, with respect to any given CPU power, the value of CPU busy ratio at which the CPU power is judged to be optimum for the current task is defined, and a permissible range of CPU busy ratio is set as a CPU load range centered on the resulting value. Making a decision as to whether or not the current CPU load is within the permissible range makes it possible to detect whether or not the currently offered CPU power is within a proper range for the current task as well as to obtain information as to whether or not the CPU power is excessive or insufficient.

FIG. 2 shows an example in which the optimum CPU power level is a CPU power level that gives a CPU busy ratio of 50%, the permissible range is set to a CPU busy ratio of 25% to 75% and the proper CPU power level is a CPU power level that gives a busy ratio within this permissible range. In this case, a CPU busy ratio that has become lower than the lower-limit value of the permissible range, 25%, would be decided to correspond to an excessive CPU power, while a CPU busy ratio that has become greater than the upper-limit of the permissible range, 75%, would be decided to correspond to an insufficient CPU power. In the application of the present invention, these set values may be set to common values to be used for all the CPU power levels, but alternatively may be set to individual values for individual CPU power levels. Also, the reference time length T for calculating the CPU busy ratio needs to be set to such ones that the time required for its calculating process cannot be recognized ergonomically, preferably being not more than 0.2 second.

<0.2 Control of CPU Power>

Figure 5:
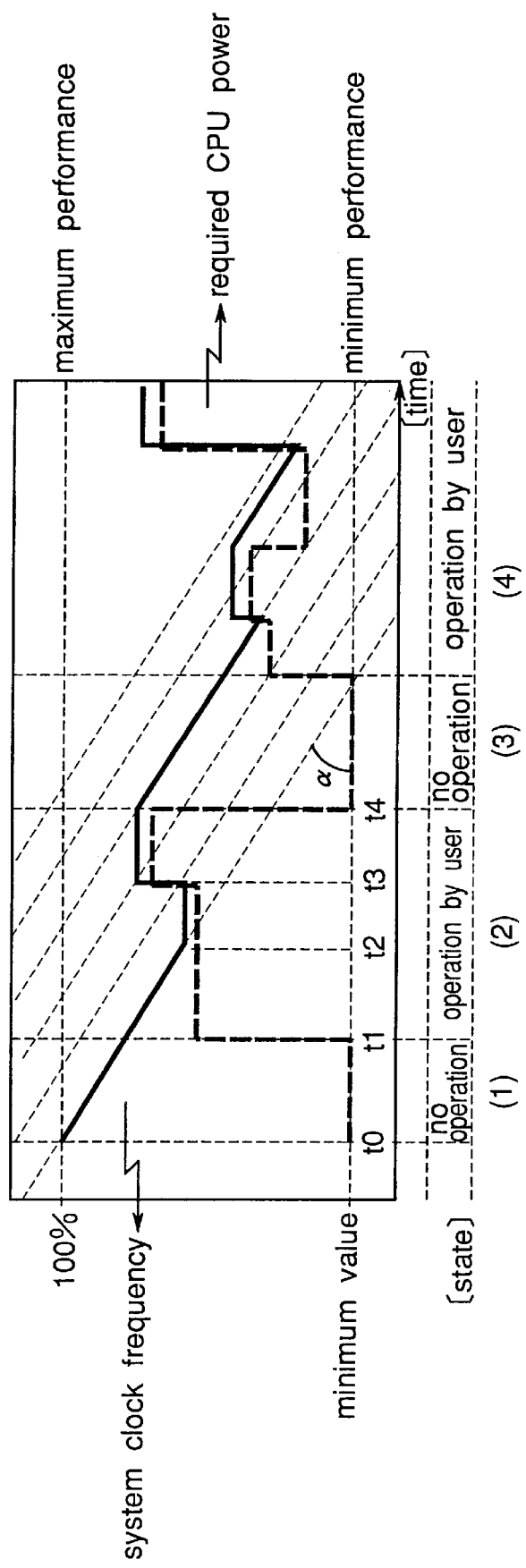
FIG. 5 is a chart showing time change in CPU power offered by the computer system based on the CPU power control versus time change in required CPU power.

FIG. 5 is a chart showing time change in the CPU power required from the task by the computer system versus time change in CPU power offered by the computer system based on the CPU power control of the present invention.

As shown in FIG. 5, the CPU power offered at an initial time t0 is at the maximum specification CPU power based on that the system clock frequency is set to a 100% system specification (maximum possible set value). It is assumed here that the initial time t0 represents not necessarily the power-on time of the computer system but an arbitrary time in the operational state of the computer system. Also, although the CPU power offered at the initial time t0 is set at the maximum specification CPU power as stated above, yet this value does not essentially restrict the operation associated with the present invention and may be set to any CPU power within the permissible range of the system.

In a time domain (1) of FIG. 5, if a task required by the user is the least possible task necessary to continue the system, then the CPU busy ratio in this time domain (1) is a small value so that the CPU opera ting ratio is in an extremely low state. Therefore, the CPU power in this case is detected as an excessive CPU power, where the CPU busy ratio has deviated to the smaller side from the range of proper CPU power level shown in FIG. 2. In the present invention, based on this detection result, the CPU power is lowered by lowering the system clock frequency or changing the combination of CPU clock frequency and later-described duty factor (in the following description of the basic principle of the present invention, for convenience's sake, the means for changing the CPU power is assumed to be implemented by varying only the system clock frequency). After the CPU power is lowered, it is checked again whether or not the CPU power at this time point is within the proper range (whether or not the CPU busy ratio is within the permissible range). If the CPU busy ratio has deviated to the smaller side from this range so that the CPU power is decided still to be an excessive one, the system clock frequency is further lower ed so that the CPU power is further lowered. This procedure is iterated until the CPU power falls within the proper range, by which the minimum CPU power level required by the current task can be offered while a comfortable state of use for the user is maintained. Thus, unnecessary power consumption can be suppressed. In the case of operation in the time domain (1) of FIG. 5, the CPU power offered by the computer system continues to be in a state higher than the CPU power required in all this time domain, so that the CPU power offered by the computer system continues to lower by degrees.

Figure 3:
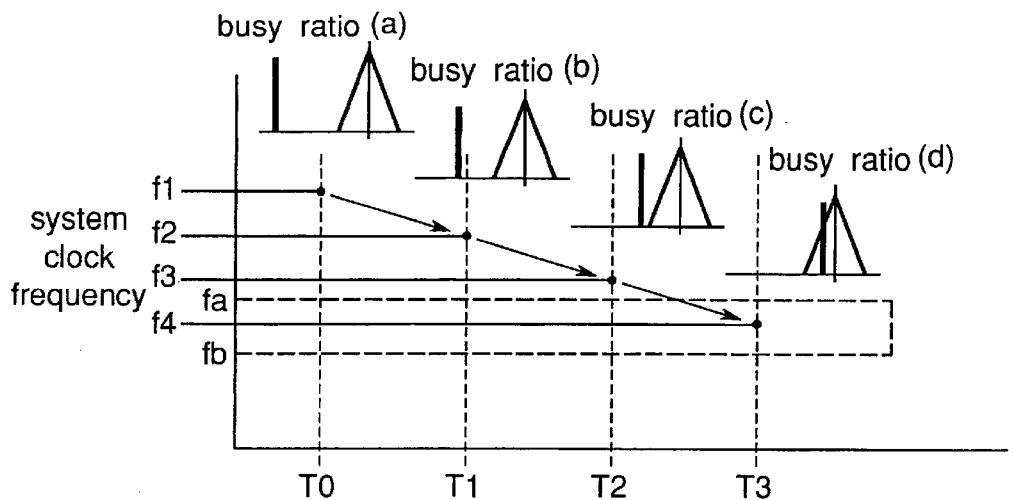
FIG. 3 is a chart for illustrating the control operation of the CPU power in the present invention.

The procedure for setting the minimum CPU power level as stated above is described in more detail by referring to FIG. 3. In FIG. 3, the proper range of CPU power required by the current task is assumed to be, in terms of system clock frequency, within a range from system clock frequencies fa to fb (hereinafter, referred to as "proper frequency range"). In addition, because this proper frequency range is a range that should originally be given as a result of calculating the CPU busy ratio at individual system clock frequencies, it is difficult to predict them beforehand and therefore difficult to describe them in the figure. However, for convenience's sake, they are described here for an easier understanding of operation.

Assuming that the system clock frequency at the initial time t0 is f1 and that the user's task does not involve a high CPU power, the CPU busy ratio relative to the current CPU power offered by the system clock frequency f1 is then given as indicated by (a) in FIG. 3, showing that the CPU power offered for the current task is an excessive one. Next, with the system clock frequency lowered to f2 based on this result, determining the then CPU busy ratio has resulted in (b) in FIG. 3. Here is shown a case in which the increment or the decrement by which the system clock frequency is varied is given by a constant value for convenience' sake, whereas this increment or decrement does not necessarily need to be a constant value. Since the system clock frequency f2 has not reached the proper frequency range, fa to fb, the CPU power reduction effect due to the change to the system clock frequency f2 has not attained any improvement over the situation of the excessive CPU power. FIG. 3 (c) shows a situation that although the system clock frequency has been further lowered from f2 to f3, the CPU power, indeed having much approached to the proper frequency range, still is an excessive one. As shown in FIG. 3 (d), by the system clock frequency being lowered from f3 to f4, the CPU busy ratio reaches the permissible range corresponding to the proper CPU level range. Accordingly, it is detected that the system clock frequency f4 is a system clock frequency for offering the minimum CPU power required by the current task without impairing a comfortable state of use for the user. Thus, in the current state of use of the system, by setting the system clock frequency to f4, the CPU power necessary for the user can be offered while unnecessary power consumption can be suppressed.

Figure 4:
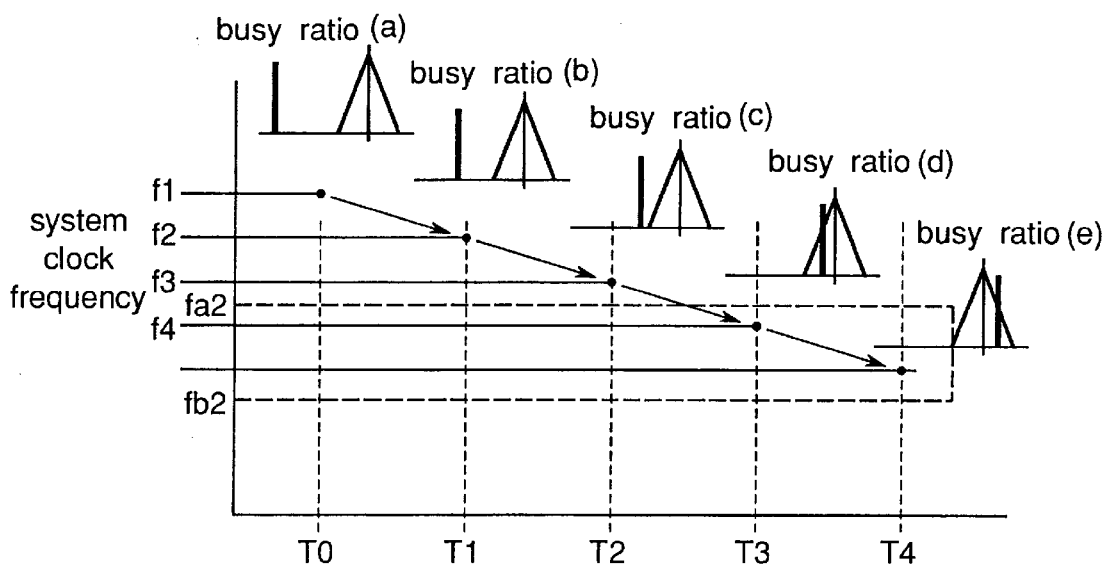
FIG. 4 is a chart for illustrating the control operation of the CPU power in the present invention.

FIG. 4 is a chart for illustrating an operation similar to the control operation of the CPU power shown in FIG. 3, but shows an operation that the range in which the CPU power holds proper (permissible range of CPU busy ratio) is set wider than in the case of FIG. 3.

Referring to FIG. 4, by the proper range of CPU power being set wider than in FIG. 3, the proper range of system clock frequency corresponding to the proper range of CPU power is enlarged to a range from fa2 to fb2. Considering system clock frequency control similar to that described in FIG. 3, the system clock frequency range corresponding to the proper range of CPU power is reached at the system clock frequency f4, whereas it is shown that the system clock frequency is still within the proper range of system clock frequency corresponding to the proper range of CPU power also at a system clock frequency f5 lowered further from f4. This is due to the enlargement of the proper range of CPU power. In this case, adopting the system clock frequency f5, a much lower system clock frequency, allows a further power consumption reduction to be obtained.

Furthermore, when the value of increment or decrement for varying the system clock frequency is set to a smaller value with respect to the proper range of system clock frequency corresponding to the proper range of CPU power, i.e., when the value of increment or decrement is set smaller than the width of the proper range of system clock frequency, there are some cases where two or more system clock frequencies decided to be proper are obtained within the proper range of system clock frequency corresponding to the proper range of CPU power. In this case, also, selecting a lower system clock frequency allows the system power consumption reduction effect to be enhanced without disturbing the comfortable state of use for the user.

Next, operation in a time domain (2) in FIG. 5 will be described. The time domain (2) in FIG. 5 shows that a task demanding also 50% of the maximum specification CPU power occurs at time t1, which state continues until time t3, and then a task requiring an even higher CPU power occurs at time t3, which CPU load state continues until time t4.

In the domain from time t1 to t2, the CPU power offered for the user by the computer system is still higher than the CPU power required by the task that has occurred during this time period. Therefore, the CPU power gradually lowers by lowering the system clock frequency until it falls within the proper range of CPU power through the CPU power control operation described as an operation in time domain (1).

At the time t2, the CPU power offered to the user by the computer system is balanced with the CPU power required in the time domain from time t1 to t3, and the CPU power continues being offered until time t3. That is, it is shown that the CPU power offered by the system clock frequency at the time t2 has reached within the proper range of CPU power, the CPU power being at the minimum level needed to offer an operating environment comfortable for user. Therefore, during the time period from t2 to t3, the user is offered a comfortable operating environment, while an effect of reducing power consumption unnecessary for the system can still be obtained.

At time t3, occurrence of a task requiring a CPU power higher than that required during the domain of time t1 to t3 destroys the balance that has been held in the domain of time t2 to t3 between the CPU power offered by the computer system and the CPU power required by the task. This change in state is detected as a change that in terms of the relationship between the permissible range of CPU busy ratio corresponding to the proper range of CPU power and the CPU busy ratio in FIG. 2, the CPU busy ratio increases so that the permissible range is deviated toward such a side that a insufficient CPU power is decided. This is also equivalent to the fact that, in the relationship between the system clock frequency and the frequency range for offering a proper CPU power in FIG. 3, the proper frequency range of system clock for offering the proper CPU power has shifted toward higher frequencies.

As described above, it can be detected at the same time that the balance of CPU power has collapsed and that the computer's CPU power offered is lower than the CPU power demanded, causing the user discomfort. Therefore, the CPU power control function of the present invention works so as to increase the CPU power offered. The operation in this process, similar to the operation for lowering the CPU power as described in FIG. 4, comprises the steps of increasing the system clock frequency by a certain increment, thereafter calculating the CPU busy ratio, deciding whether or not the result is within the permissible range, and iterating a similar operation until the calculation result reaches within the permissible range. The CPU power to be offered after the attainment to within the permissible range until the time t4 corresponds to the minimum CPU power that allows the user to maintain a comfortable state of use with respect to the required CPU power, as in the foregoing case where the CPU power is lowered. Therefore, the offer of any excessive CPU power can be suppressed and an effect of reducing power consumption unnecessary for the system can be obtained also in this case.

Likewise, also in the time domains (3), (4), by similar CPU power control operations, power consumption reduction effects of the system can be obtained without disturbing the comfortable state of use for the user.

First Embodiment the first embodiment of the present invention will be described below with reference to the accompanying drawings.

<1.1 General Configuration>

Figure 6:
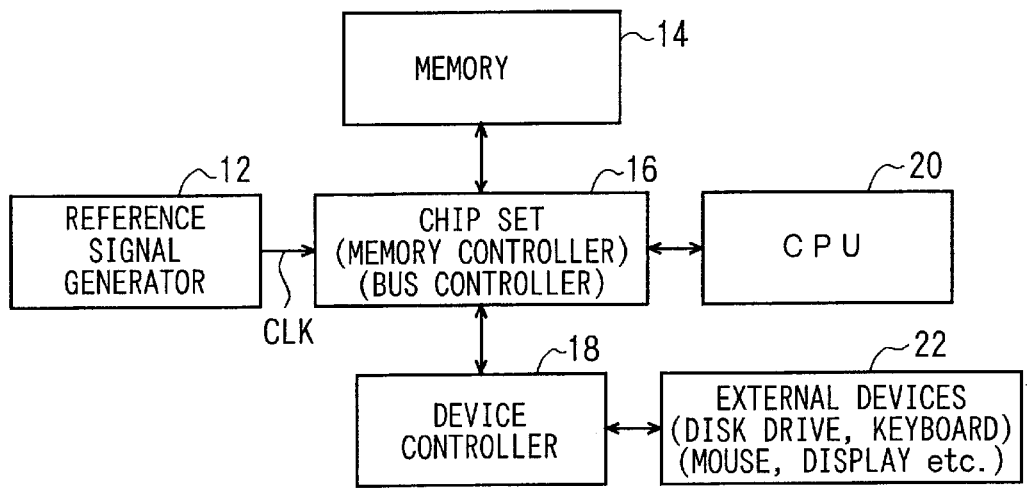
FIG. 6 is a functional block diagram showing the configuration of a computer system which is a first embodiment of the present invention.

FIG. 6 is a functional block diagram showing the configuration of a computer system which is the first embodiment of the present invention having a power consumption control function based on the above basic principle. This computer system has a standard configuration of today's personal computers, in which a reference signal generator 12 which is a clock generator for generating a system clock as a reference signal of the computer system, a memory 14 as main storage, and a device controller 18 for controlling external devices such as disk units, a keyboard, a mouse and a display unit are connected to a chip set 16 serving as both a memory controller and a bus controller. In this computer system, with such a configuration, a CPU 20 executes a specified program stored in the memory 14, by which the aforementioned power consumption control function is fulfilled. In addition, a general-purpose timer is provided within the chip set 16, and used for the later-described detection of the CPU busy ratio.

<1.2 Constitution and Operation of Reference Signal Generator>

Figure 7:
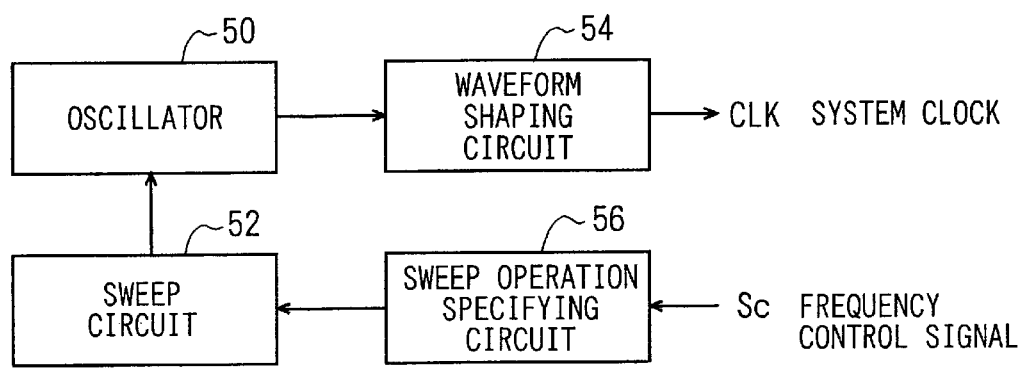
FIG. 7 is a functional block diagram showing the configuration of a reference signal generator in the first embodiment.

As can be understood from the foregoing description of the basic principle, performing power consumption control involves a function of controlling the system clock frequency. Therefore, in this embodiment, the reference'signal generator 12 is constructed as shown in FIG. 7. FIG. 7 is a functional block diagram showing one construction example of the reference signal generator 12 which is capable of continuously generating system clocks of different frequencies. This reference signal generator 12 comprises an oscillator 50, a sweep circuit 52, a waveform shaping circuit 54 and a sweep operation specifying circuit 56.

In this constitution, the oscillator 50 is implemented by, for example, a bridge type CR oscillator, and the sweep circuit 52 is a circuit that continuously varies the oscillation frequency by continuously varying at a specified rate the capacitance, which is one of the circuit constants that determine the oscillation frequency of the oscillator 50. Operation of this sweep circuit is controlled by the sweep operation specifying circuit 56 according to a frequency control signal Sc. That is, direction and rate of variations in the oscillation frequency of the oscillator 50 is specified by the frequency control signal Sc. The waveform shaping circuit 54 is a circuit for shaping the waveform of the oscillation signal derived from the oscillator 50 into a rectangular waveform suited for the system clock signal, and can be implemented by a flip-flop or Schmitt trigger circuit or the like. The waveform-shaped oscillation signal is outputted as a system clock CLK from the reference signal generator 12.

According to the reference signal generator 12 as shown in FIG. 7, system clocks CLK of continuously varying frequencies can be generated by continuously operating the sweep circuit 52 and thereby continuously varying the capacitor which is a circuit constant of the oscillator 50.

Figure 8:
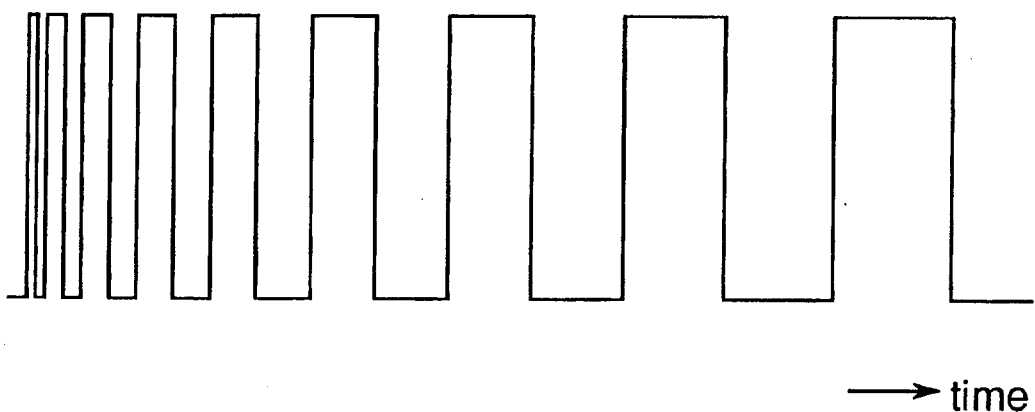
FIG. 8 is a signal waveform chart showing a system clock obtained by the reference signal generator in the first embodiment.
Figure 9:
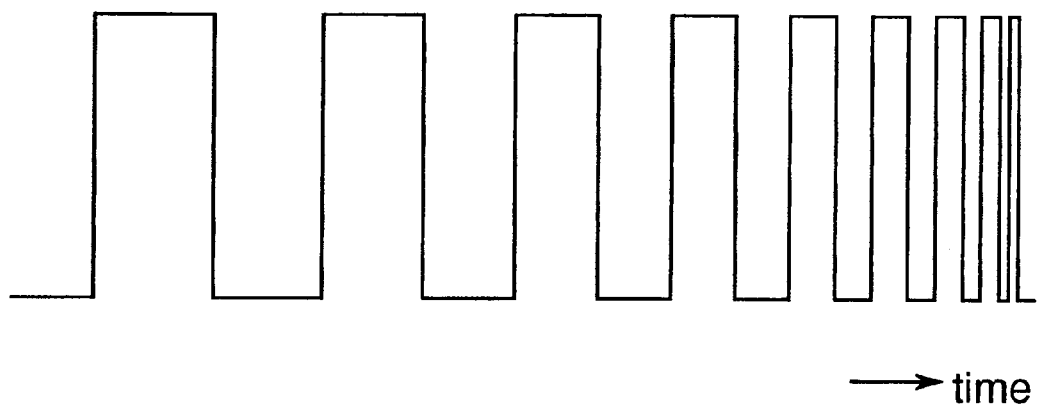
FIG. 9 is a signal waveform chart showing a system clock obtained by the reference signal generator in the first embodiment.
Figure 10:
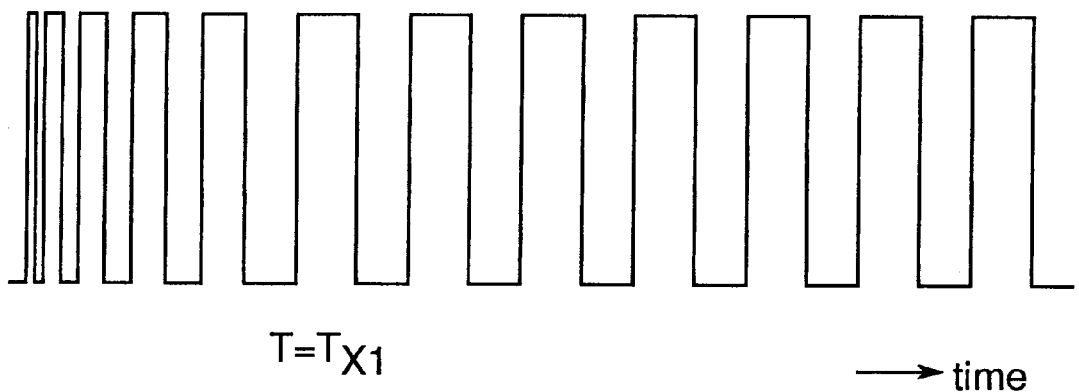
FIG. 10 is a signal waveform chart showing a system clock obtained by the reference signal generator in the first embodiment.
Figure 11:
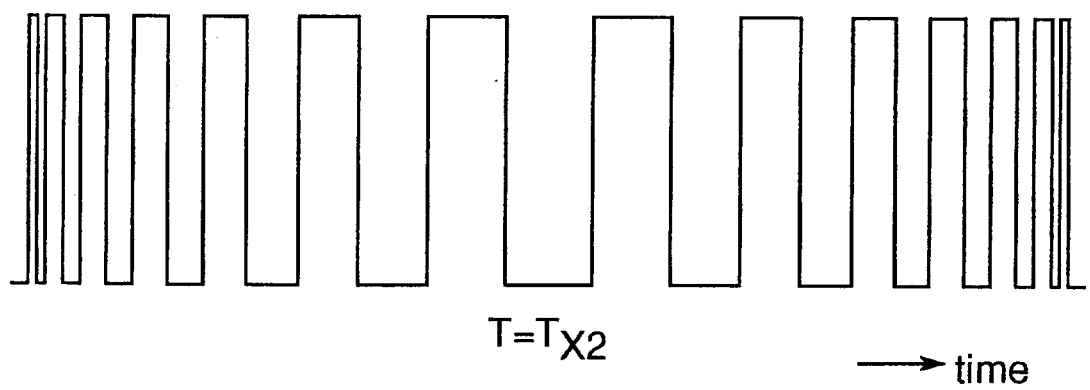
FIG. 11 is a signal waveform chart showing a system clock obtained by the reference signal generator in the first embodiment.

FIG. 8 is a signal waveform chart showing an example of the system clock obtained by the reference signal generator having the above construction, illustrating a case where the frequency of the system clock CLK becomes continuously lower with time elapse. FIG. 9, on the other hand, illustrates a case where the frequency of the system clock CLK becomes continuously higher with time elapsing. In FIGS. 8 and 9, two cases of variations in the system clock frequency are shown, one in which the system clock frequency varies from the highest possible frequency to the lowest possible frequency and the other in which the frequency varies from the lowest possible frequency to the highest possible frequency, respectively. However, the reference signal generator 12 of the above constitution is enabled to generate a system clock CLK of a fixed frequency by halting the operation of the sweep circuit 52 at an arbitrary frequency within the frequency range. That is, as shown in FIG. 10, it is possible that, for example, the system clock CLK that has been continuously lowered in frequency from a higher frequency is shifted at time T×1 into a fixed-frequency state. It is also possible that, as shown in FIG. 11, the direction of frequency variation is reversed by varying the operation of the sweep circuit at time T×2, or that the system clock frequency is varied either higher or lower than the current state. Furthermore, the system clock frequency can be varied not only at a fixed rate but also at any arbitrary rate by varying the operation of the sweep circuit 52 and thereby, for example, varying the amount by which the capacitance value is changed per unit time.

Besides, by applying external control to the sweep operation specifying circuit 56 from equipment incorporated in the computer system such as a keyboard controller, the system clock frequency can be controlled from system software that controls the computer system, or software that administers the power consumption control, so that the CPU power can be set as required.

The present embodiment has been shown on a case in which the oscillator 50 is a bridge type CR oscillator, and the sweep circuit 52 is a circuit that continuously varies the capacitance, which is one of the circuit constants associated with the oscillation frequency of the oscillator 50. However, the oscillator 50 may alternatively be an LC oscillator or other oscillator, and the circuit constant of the oscillator 50 to be varied by the sweep circuit 52 may be resistance or inductance, where the function can be achieved by varying a circuit constant responsive to the oscillator 50. Besides, another example of the waveform shaping circuit 54 may be a Schmitt trigger circuit or the like.

<1.3 Operation>

Based on the above-described basic principle, in the present embodiment, the frequency of system clock CLK is varied to offer an optimum CPU power. The unit in which the frequency of the system clock CLK is varied stepwise is a predetermined fixed quantity (hereinafter, referred to as "unit variation"). Depending on the value of this unit variation, the precision in making a decision of the proper CPU power is determined. This unit variation also corresponds to the set value of frequency variation per process for deciding whether or not the current CPU power is within the proper range.

Accordingly, when the unit variation is set to a large value, there is a possibility that the system clock frequency may be largely deviated from the one that gives an optimum CPU performance level. That is, there is a possibility that the precision of CPU power control may lower. When the unit variation is set to a small value, indeed the precision of CPU power control can be enhanced but, with a large difference between the system clock frequency that gives the current CPU power and the system clock frequency that gives an optimum CPU power, many processes are involved until a targeted system clock frequency is reached so that, in some cases, a system delay due to the execution of this frequency control process may cause the user discomfort.

The present embodiment employs the function of continuously varying the system clock frequency, which the reference signal generator 12 has, so that high-precision CPU power control is implemented by less processes, thus capable of reducing the user's discomfort due to an increase in the process amount of frequency control. For this purpose, in this embodiment, the CPU 20 executes a specified program (hereinafter, referred to as "control software") to control the frequency of system clock CLK while detecting CPU busy ratio. Below, the operation of such CPU power control by varying the system clock frequency will be described by referring to the flow chart of FIG. 12.

First, a CPU busy ratio Rb is calculated by calling up a later-described CPU busy ratio detection routine (step S10). Next, based on this CPU busy ratio Rb, it is decided whether the power of the CPU 20 is insufficient, excessive or proper with respect to a task currently requested for the computer system of this embodiment (step S12). This decision is made depending on whether or not the CPU busy ratio Rb falls within a previously set permissible range. For example, on condition that the permissible range of CPU busy ratio Rb=25% to 70% as shown in FIG. 2, if Rb>25%, then an excessive CPU power is decided; if Rb>75%, then an insufficient CPU power is decided; and if $25\% \leq Rb \leq 75\%$, then a proper CPU power is decided.

When an insufficient CPU power is decided, the program goes to step S14, where a frequency control signal Sc that gives an instruction to raise the system clock frequency at a specified rate of change (variation of frequency per unit time) is inputted to the reference signal generator 12, and then a first timer that is a general-purpose timer within the chip set 16 is activated (step S18). By contrast, when an excessive CPU power is decided, the program goes to step S16, where a frequency control signal Sc that gives an instruction to lower the system clock frequency at a specified rate of change is inputted to the reference signal generator 12, and then the first timer is activated (step S18). After the activation of the first timer, the program goes to step S20, where the decision whether or not a previously specified time (hereinafter, referred to as "specified time") has elapsed is iterated until the specified time elapses, based on the time measured by the first timer. As a result, the system clock frequency is raised by the unit variation for an insufficient CPU power, or lowered by the unit variation for an excessive CPU power. With the specified time elapsed at step S20, the program returns to step S10 and thereafter the above operation is iterated.

Meanwhile, if a proper CPU power is decided at step S12, then the program returns to step S10, as it is, where the above operation is iterated.

Through the foregoing operations, even if the CPU power is in either insufficient or excessive state with respect to the task required for the computer system, the CPU power falls within the proper range by the control of system clock frequency and, from this afterwards, the system clock frequency (CPU power) iteratively varies within the range.

In the above description, when a proper CPU power is decided at step S12, the program directly returns to step S10. Instead, it may be arranged that when a proper CPU power is decided, a frequency control signal Sc that gives an instruction to halt the variation of the system clock frequency, i.e., a frequency control signal Sc that gives an instruction to halt the operation of the sweep circuit 52 is inputted to the reference signal generator 12 and then the program returns to step S10. In this case, once the CPU power has entered within the proper range as a result of the system clock frequency control, the system clock frequency will not vary from now on unless the task required for the computer system undergoes any change.

Figure 12:
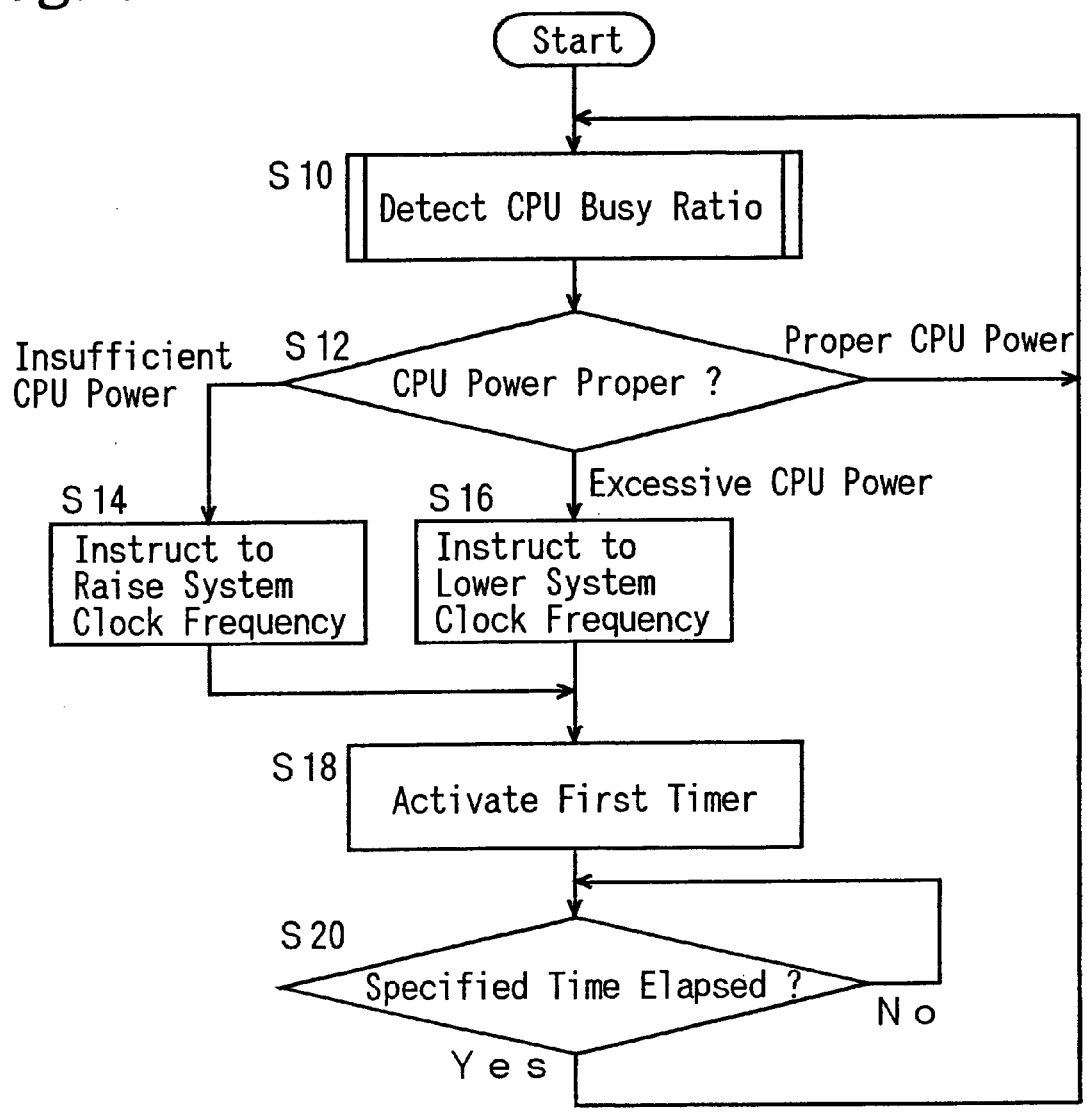
FIG. 12 is a flow chart showing the operation of controlling the CPU power in the first embodiment.

Detection of the CPU busy ratio at step S10 in the flow chart of FIG. 12 is executed by software by using second and third timers, which are general-purpose timers within the chip set 16. That is, by the CPU 20 executing a specified program, the detection of CPU busy ratio is performed. Now the detection of CPU busy ratio will be described by referring to the flow chart shown in FIG. 13.

Figure 13:
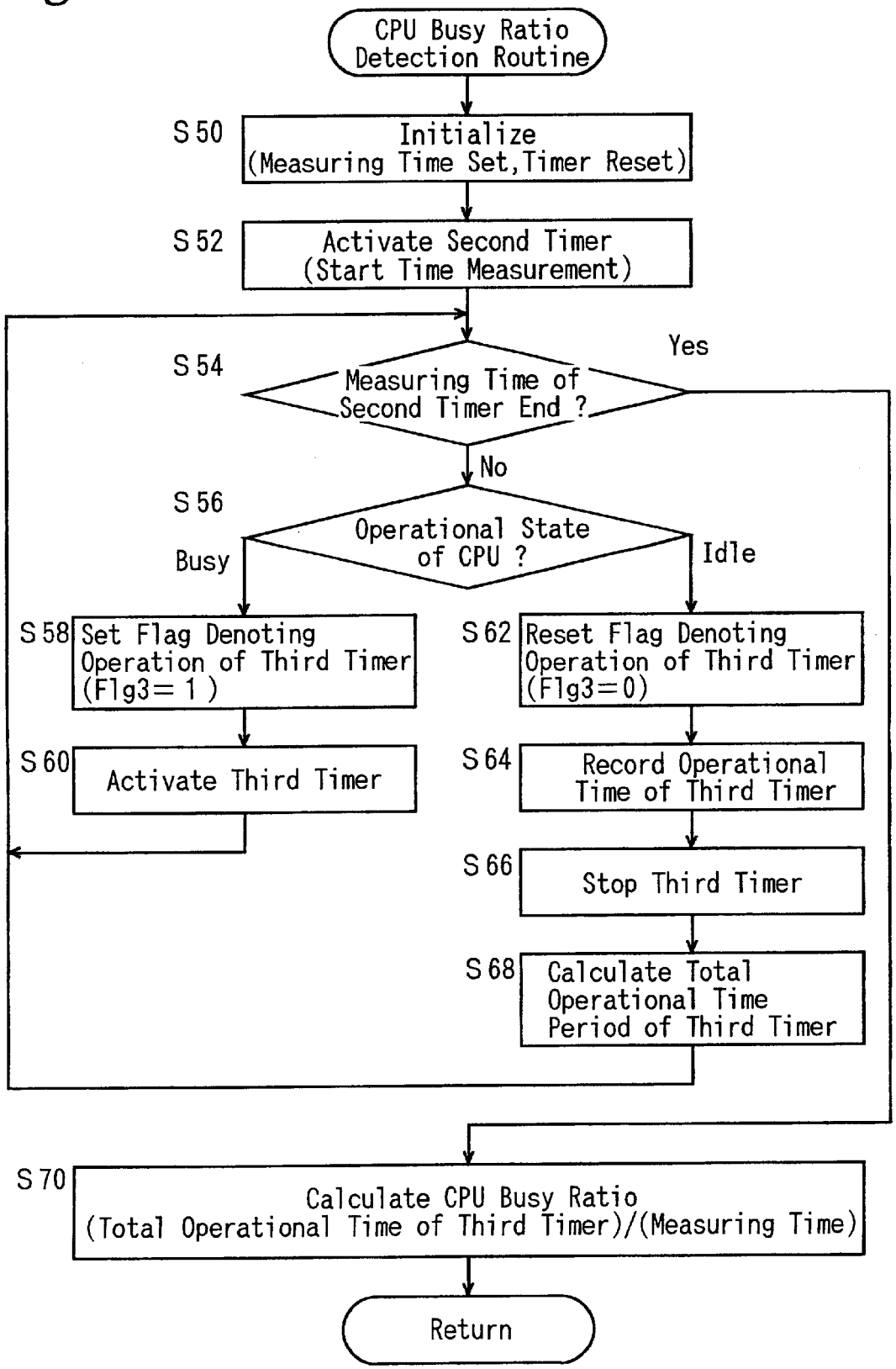
FIG. 13 is a flow chart showing the operation of detecting the CPU busy ratio in the first embodiment.

FIG. 13 is a flow chart showing the contents of a CPU busy ratio detection routine (step S10 in FIG. 12). In the CPU busy ratio detection routine, first, a measuring time T (hereinafter, also referred to as "reference time") that serves as a reference in determining the CPU busy, ratio is set, while the second and third timers are reset (initialized), and subsequently the second timer is activated to start the time measurement (step S52). After that, depending on whether or not the time measured by the second timer has exceeded the reference time T set at step S52, it is decided whether or not the measuring time has ended (step S54).

As a result, if the measuring time has not yet ended, the program goes to step S56, where a BIOS (Basic Input/Output System) routine is called up and it is decided whether the CPU 20 is in busy or idle state (recognition of operational state of CPU 20). If the CPU 20 is busy, the program goes to step S58, where a flag Flg3 denoting that the third timer is in operation is set (Flg3=1), and the third timer is activated, followed by a return to step S54. If the CPU 20 is in the idle state, on the other hand, the program goes to step S62, where the flag Flg3 denoting that the third timer is in operation is reset (Flg3=0), the time for which the third timer has operated is recorded (step S64), and then the third timer is stopped (step S66). Then, operational time periods of the third timer stored up to this time point are totaled (step S68), followed by a return to step S54.

From this on, until the measuring time by the second timer is ended, the steps of S54→S56→S58→S60, or the steps of S54→S56→S62→S64→S66→S68 are iteratively executed depending on whether the CPU 20 is in the busy state or the idle state. Then, upon completion of the measuring time by the second timer, the program goes to step S70. At the time point of the move to step S70, the total value (hereinafter, designated by "Tb") calculated at step S68 is a total sum of the time periods in which the CPU 20 is in the busy state during the reference time T, which is the measuring time by the second timer. Therefore, at step S70, the CPU busy ratio Rb is calculated according to $$Rb = Tb/T \qquad (1)$$

Thus, the CPU busy ratio detection routine is ended, and the program returns to the routine from which this routine has been called up (see FIG. 12).

<1.4 Example of CPU Power Control Operation>

Next, a concrete example of the CPU power control operation in the computer system of this embodiment that operates as shown above will be described by way of operation in the time domain (2) shown in FIG. 5. In the time domain (2) in FIG. 5, a task requiring about 50% of the CPU maximum specification power occurs at time t1, which state continues until time t3, and after this, a task requiring an even higher CPU power occurs, which state continues until time t4.

In the domain from time t1 to time t2, the CPU power that the computer system of this embodiment offers keeps still higher than the CPU power required by the tasks that have occurred during this time period, so that an excessive CPU power is decided at step S12 of FIG. 12. Then, by step S16, the frequency of system clock CLK is gradually lowered in steps of the unit variation.

The CPU power lowers with lowering system clock frequency, so that the CPU power offered by the computer system is balanced at time t2 with the CPU power required in the domain from time t1 to time t3. That is, the CPU power at the system clock frequency reaches within the proper range of FIG. 2 at time t2, being a minimum CPU power required to offer a comfortable operating environment to the user. From this onward, the system clock frequency still remains within a specified frequency range at which the CPU power falls within the proper range. Accordingly, in the domain from time t2 to time t3, power consumption unnecessary for the computer system can be cut off while an optimum operating environment is offered to the user.

At time t3, there occurs a task requiring a CPU power higher than the CPU power that has been required in the domain time t1 to time t3, where the balance (a balance between the CPU power offered by the computer system and the CPU power required by a task) held in the domain from time t2 to time t3 collapses. This change of state corresponds, in terms of the relationship between the permissible range corresponding to the proper range of CPU power and the CPU busy ratio Rb in FIG. 2, to a fact that the CPU busy ratio Rb becomes larger so as to deviate from the permissible range toward insufficient CPU powers. This change of state also corresponds, in terms of the relationship between the system clock frequency and the frequency range for offering a proper CPU power in FIG. 3, to a fact that the system clock frequency for offering a proper CPU power has shifted toward higher frequencies. Accordingly, an insufficient CPU power is decided at step S12, and the frequency of system clock CLK increases in steps of the unit variation by step S14. In this way, the operation that the system clock frequency is raised in steps of the unit variation while deciding whether or not the CPU power is within the proper range (where an improper CPU power is an insufficient CPU power in this stage) by calculating the CPU busy ratio Rb, i.e., while deciding whether or not the CPU busy ratio is within the permissible range, is iterated until the CPU power reaches within the proper range. The CPU power offered over the period from the reach within the proper range until time t4 corresponds to the minimum CPU power that offers a comfortable operating environment to the user, as in the case where the CPU power is lowered until the time t2, making is possible to prevent the offer of any excessive CPU power. As a result, power consumption unnecessary for the computer system can be cut off.

In the first embodiment, as described above, when an insufficient CPU power or an excessive CPU power is decided based on a detection result of the CPU busy ratio Rb, the system clock is raised or lowered in steps of the unit variation. In this case, there arises a need of process for detecting that the transition of the system clock frequency in unit variation has been completed. In this embodiment, this detection is implemented by time measurement by means of timer without measuring the system clock frequency. More specifically, after a direction of change in the system clock frequency (i.e., whether to raise or lower the frequency) and a rate of change (frequency variation per unit time) are specified to the sweep operation specifying circuit 56 in the reference signal generator 12 by the frequency control signal Sc, time is measured (steps S14 through S20), by which the completion of transition of the system clock frequency in unit variation is detected.

Figure 14:
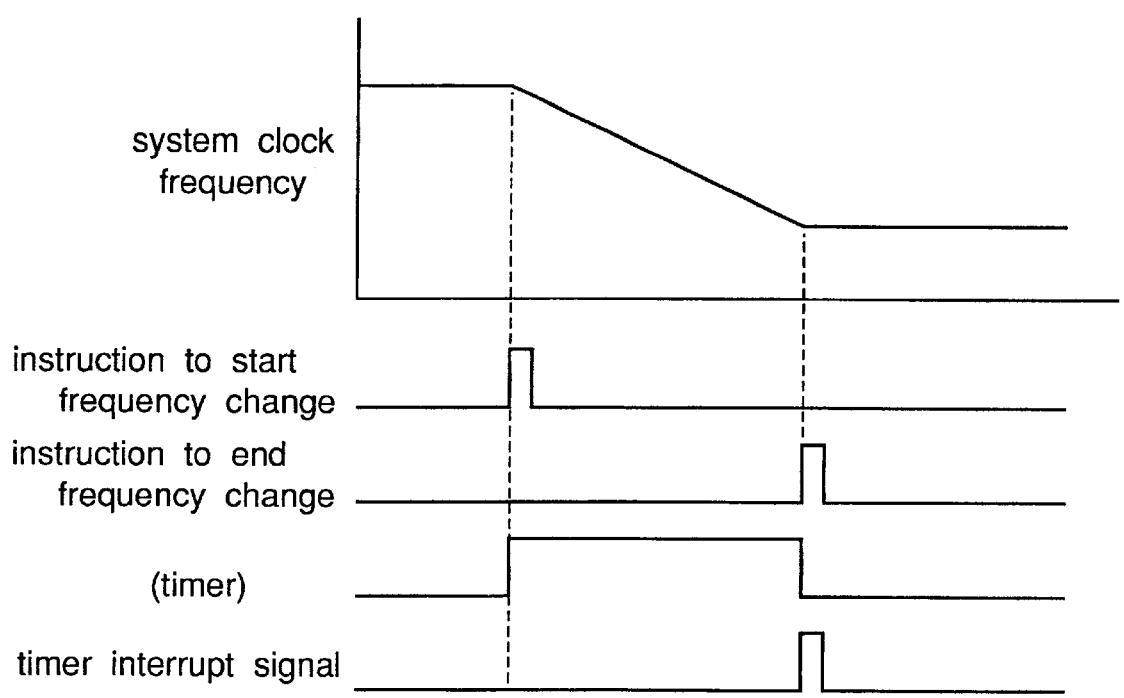
FIG. 14 is a chart for illustrating a method of varying the system clock frequency in the first embodiment.

In the flow chart shown in FIG. 12, a standby state is held for a specified time corresponding to unit variation by iteratively executing the decision of step S20, which process is actually implemented by timer interrupt. That is, the transition completion of unit variation in the system clock frequency is detected by using the timer interrupt as shown in FIG. 14. In this case, the control software comes to a standby state after setting the first timer, and resumes the execution by detecting the transition completion of unit variation in the system clock frequency upon receiving an interrupt signal after the elapse of the specified time (see step S20). With such an arrangement, there occurs no process for measurement during the time period required for the transition of the system clock frequency. This makes it possible to avoid the risk that a system delay may cause the user discomfort due to the execution of the process for observing the transition of system clock frequency.

Further, because the unit variation of system clock frequency can be specified as a time elapsing until the timer generates an interrupt, the unit variation for changing the system clock frequency can be defined resultantly by defining a time per decision of the CPU power (the elapsed time from one decision to the succeeding decision) based on the CPU busy ratio Rb with respect to a predetermined rate of change of the system clock frequency.

Second Embodiment

Hereinbelow, a second embodiment of the present invention will be described with reference to the accompanying drawings.

<2.1 Configuration>

The basic configuration of a computer system of this embodiment is similar to that of the first embodiment and as shown in FIG. 6. However, whereas the first embodiment employs means for changing the system clock frequency as a means for moving the CPU power to within the proper range, this embodiment employs a signal generator capable of generating system clocks of a plurality of kinds of different frequencies and besides changes the combination of CPU clock frequency and duty factor by intermittently generating CPU pulses at a specified duty factor to move the CPU power to within the proper range.

Figures 16, 17:
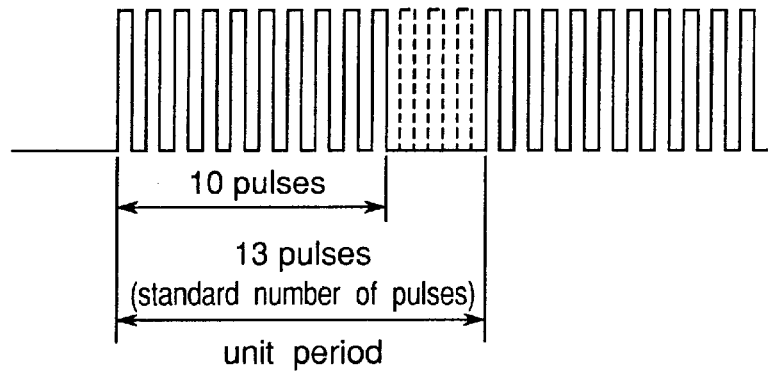
FIG. 16 is a diagram for illustrating the definition of the duty factor of CPU clock.
FIG. 17 is a view showing a transition table in the second embodiment.

For this purpose, this embodiment employs a signal generator capable of generating system clocks of four kinds of different frequencies by external control, like a signal generator Model CY2291 marketed by Cypress Co. Moreover, in this embodiment, the system clock is periodically stopped by a specified signal to the CPU 20 or the chip set 16, by which a CPU clock that intermittently generates pulses at a specified duty factor is obtained. The duty factor herein referred to can be defined as a value resulting from dividing a period during which pulses are generated out of a specified unit time (hereinafter, referred to as "defined unit period"; when the system clock CLK is stopped periodically, the period may be used as the defined unit period), by the defined unit period. That is, the duty factor is an index that designates a ratio of currently given CPU clock pulses to continuously generated pulses. FIG. 16 shows a concrete example of this definition of duty factor, in which example, with a period of 13 pulses of the CPU clock given as the defined unit period, pulses are actually present in the period of 10 pulses during the defined unit period while pulses are absent in the period of the remaining 3 pulses. In this case, the duty factor of CPU clock is $10/13=76.9\%$. In addition, in FIG. 16, which shows the definition of duty factor of CPU clock, a notation of 13 pulses as a standard number of pulses is an example for easier description, varying depending on the setting of the defined unit period as well as on the CPU clock frequency.

Also, in the memory 14 within the computer system of this embodiment, as a look-up table for changing the combination of CPU clock frequency and duty factor, is prepared a table (hereinafter, referred to as "transition table") in which, with a combination of CPU clock frequency taken as one element, various elements corresponding to various combinations are registered in increasing or decreasing order of CPU performance level defined by the product of CPU clock frequency and CPU clock duty factor.

FIG. 17 shows an example of the transition table of CPU clock frequency, CPU clock duty factor and CPU performance level. In the example of FIG. 17, 17 kinds of CPU clock states are given in an increasing order of CPU performance level that depends on the combination between four kinds of CPU clock frequencies, 33.3 MHz, 40 MHz, 50 MHz and 66.6 MHz, and several kinds of CPU clock duty factors. These 17 kinds of CPU clock states correspond to the aforementioned various elements, each element being assigned a step number. Besides, a change of the CPU clock frequency and duty factor in the unit of one step corresponding to a move between adjacent elements is the unit of transition of CPU clock state.

<2.2 Operation>

Figure 15:
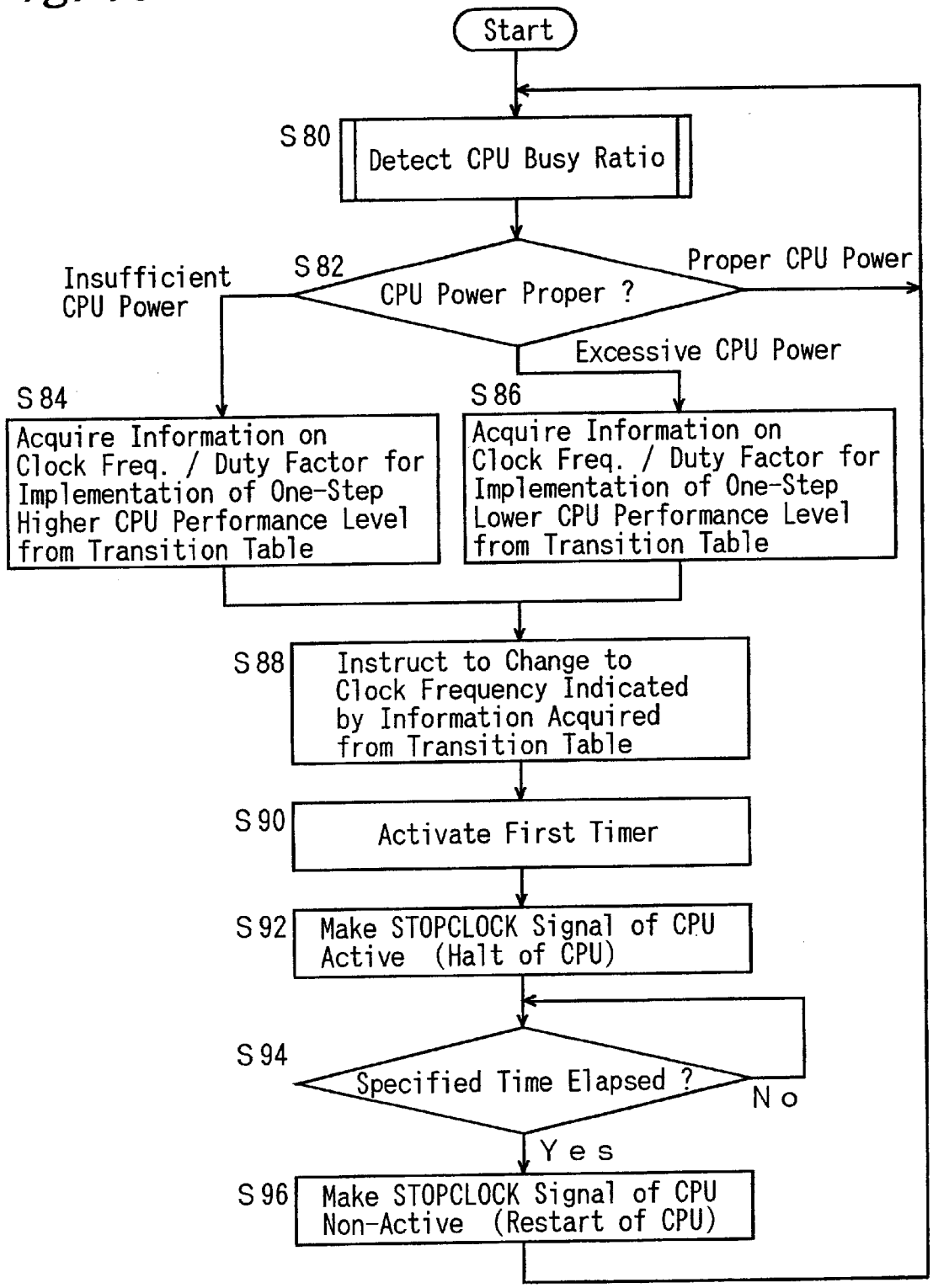
FIG. 15 is a flow chart showing the operation of controlling the CPU power in a second embodiment.

In this embodiment, the CPU 20 executes control software, which is a specified program stored in the memory 14, thereby iterating the steps of changing the combination of CPU clock frequency and CPU clock duty factor to an adjacent element in the transition table by looking up to the transition table as described above, and deciding whether or not the then resulting CPU busy ratio is included in the CPU permissible range, until the CPU busy ratio is included the permissible range. Operation for CPU power control based on such control software will be described below with reference to the flow chart shown in FIG. 15.

First, a CPU busy ratio Rb is calculated by calling the CPU busy ratio detection routine (step S80). Next, based on the resulting CPU busy ratio Rb, it is decided whether the CPU power is insufficient,. excessive or proper, with respect to the task currently required of the computer system of this embodiment (step S82). The concrete processing of these steps S80, S82 and the processing of the CPU busy ratio detection routine are similar to those of the first embodiment (see FIG. 13 and FIG. 2).

If an insufficient CPU power is decided at step S82, the program goes to step S84, where information on clock frequency and duty factor for a performance level one-step higher than the current-time performance level is acquired from the transition table, the program moving to step S88. On the other hand, if an excessive CPU power is decided at step S82, the program goes to step S86, where information on clock frequency and duty factor for a performance level one-step lower than the current-time performance level is acquired from the transition table, the program moving to step S88.

At step S88, a specified control signal is inputted to the reference signal generator 12 capable of generating system clocks of a plurality of kinds of frequencies, by which the CPU clock frequency is changed to a frequency indicated by the information acquired at steps S84 or S86. For example with the use of the transition table shown in FIG. 17, in the state that the CPU clock is 33.3 MHz and the duty factor is 100%, i.e., in the clock state of STEP10, if an insufficient CPU power is decided, a control signal for specifying a CPU clock frequency of 40 MHz to the reference signal generator 12 to move the performance level to one-higher STEP11 is inputted. In addition, when no change in CPU clock frequency is involved as in a move from STEP9 to STEP10, the CPU clock frequency is not changed by step S88.

At the next step S90, the first timer, which is a general-purpose timer prepared in the chip set 16, is activated and afterwards the CPU clock is stopped at step S92. The stop of CPU clock is, in this embodiment, implemented by making active a STOPCLOCK signal, which is an input signal to the CPU 20. As the CPU clock is stopped, the CPU 20 holds a standby state until a timer interrupt by the first timer occurs (step S94). The standby time in this case is a time that specifies the duty factor indicated by the information acquired by step S84 or S86, being a time to be set at the time when the first timer is activated as a time period, out of the defined unit period, for which the CPU clock is stopped (hereinafter, referred to as "specified time").

After the activation of the first timer, as the specified time has elapsed, the STOPCLOCK signal of the CPU. 20 is made non-active, by which the CPU 20 is restarted (step S96). With the CPU 20 restarted, the program returns to step S80 and the above-described operation is iterated.

On the other hand, if a proper CPU power is decided at step S82, the program returns to step S80 as it is, and the above-described operation is iterated.

<2.3 Example of CPU Power Control Operation>

Figure 18:
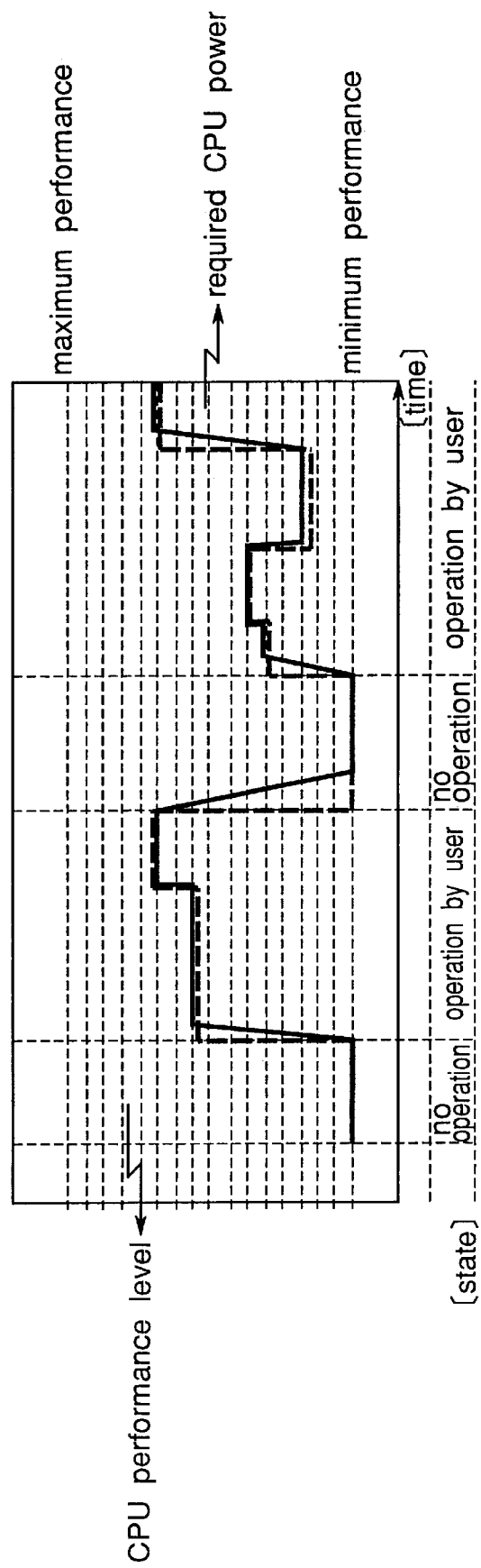
FIG. 18 is a chart showing a concrete example of the CPU power control operation in the second embodiment.

FIG. 18 is a view showing a concrete example of the CPU power control operation in this computer system. This example shows that the CPU load is shifted to within the proper range by looking up the transition table (FIG. 17) in which the CPU performance level is divided evenly into 17-level steps based on the control software. That is, after the CPU power required according to the task of the computer system is detected, the STEP (combination of CPU clock frequency and duty factor) in the transition table is shifted one by one in a required direction, so that a proper CPU load state is created. As a result, the offer of any excessive CPU power is suppressed so that power consumption unnecessary for the computer system can be cut off.

In addition, the description with respect to FIG. 18 has been made on the assumption that the unit variation during the transition of CPU performance level is one step in the transition table. However, the control software is allowed to specify transition of two or more steps for one-time decision process on the CPU power. Further, it is also possible that any step change decided as optimum for the system is specified; for example, two- or more-step changes are allowed only when the required CPU power has been increased, or a two-step change is specified necessarily for the first-time decision process.

Third Embodiment

This embodiment is characterized in that the transition table created based on the magnitude of CPU power level shown in the second embodiment is optimized for a system driven by a battery, in particular those that are relatively large in internal resistance and unsuited for large current discharge, such as lithium ion secondary batteries.

Figure 19:
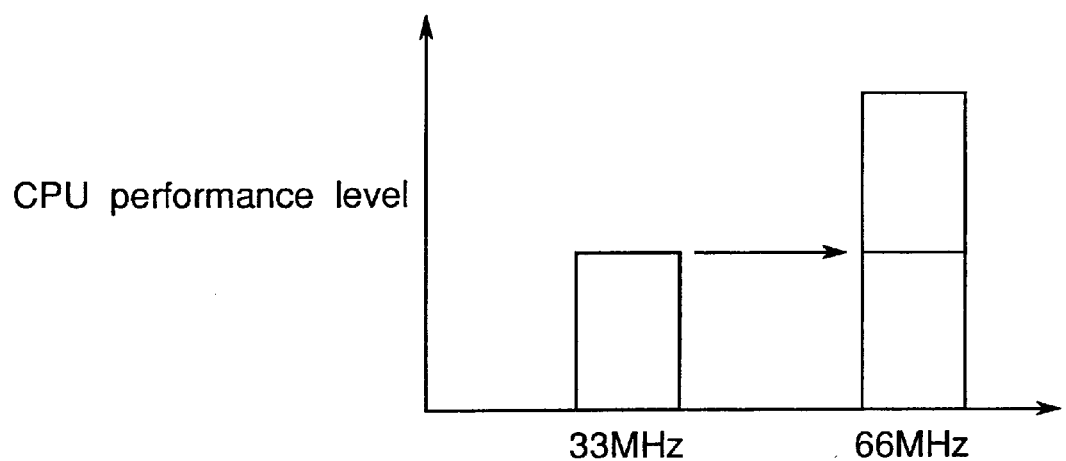
FIG. 19 is a chart for illustrating the relationship between CPU performance level, CPU clock frequency and battery discharge current.

As shown in FIG. 19, the CPU performance level (33×100=3300) with a CPU clock frequency of 33 MHz and a CPU clock duty factor of 100% is the same as the performance level (66×50=3300) with a CPU clock frequency of 66 MHz and a CPU clock duty factor of 50%. Therefore, from the viewpoints of proper CPU load level and reduction in power consumption, both CPU clock states are equivalent to each other.

Figure 20:
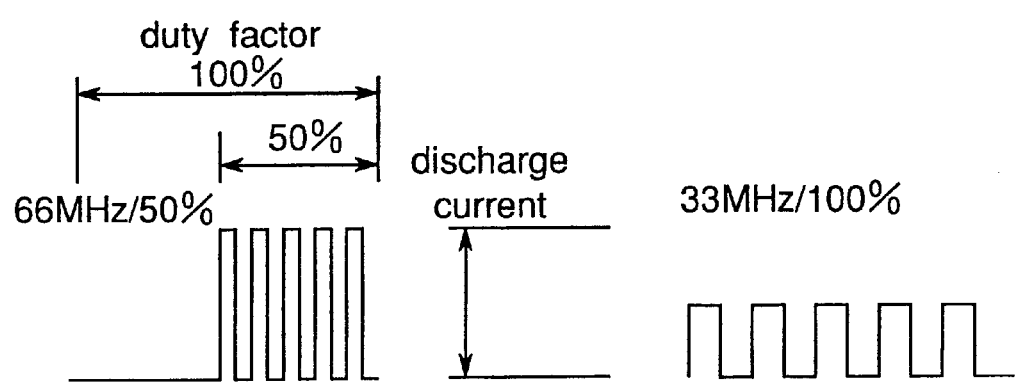
FIG. 20 is a diagram for illustrating the relationship between CPU performance level, CPU clock frequency and battery discharge current.

However, as is generally known, particularly the lithium ion secondary battery is about one order larger in internal resistance than the conventional NiCd secondary battery, so that discharge of a large current would cause the terminal voltage of the battery to lower to a considerable extent, with the result that only a decreased amount of energy could be extracted, compared with discharge of a small current. Between above two CPU clock states, even if they are equivalent in CPU performance level and identical in power consumption of the system, the maximum current level at a discharge of the battery is greater in the case of a CPU clock frequency of 66 MHz. That is, as shown in FIG. 20, in the case of the CPU clock frequency of 33 MHz and the CPU clock duty factor of 100%, discharge from the battery is required at all times, whereas the maximum current value is relatively small. In contrast to this, in the case of the CPU clock frequency of 66 MHz and the CPU clock duty factor of 50%, although the time for which the battery performs discharge can be saved to one half of that in the case of the CPU clock frequency of 33 MHz and the CPU clock duty factor of 100%, yet the maximum discharge current value is large. Even with the same power consumption of the system, a large current discharge, when needed, is equivalent to an effective decrease in the battery capacity, so that the time for which the system can be driven with the same battery becomes shorter.

Figures 21, 22:
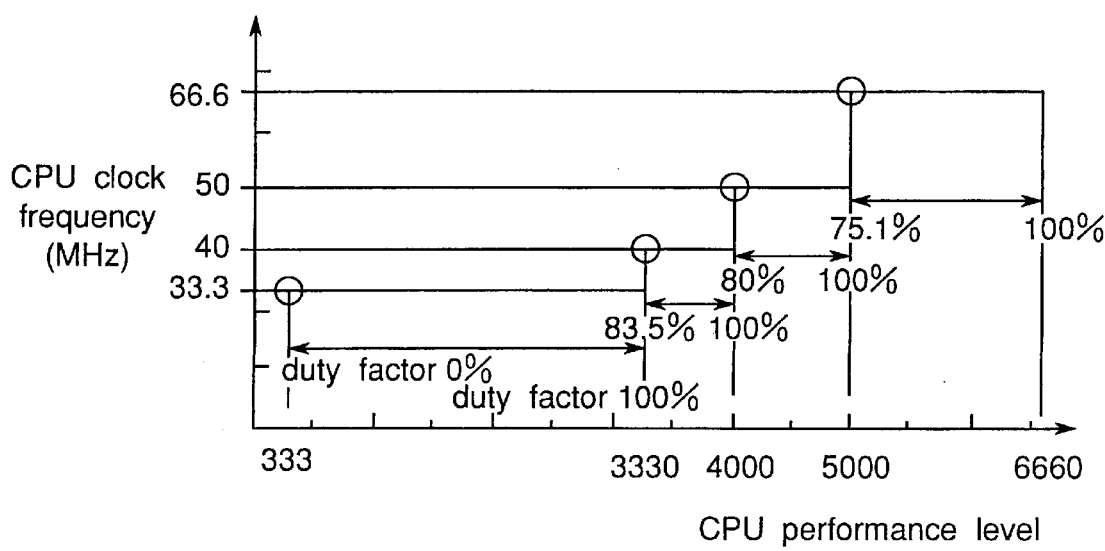
FIG. 21 is a view showing clock frequency transition points which form the basis for creating a transition table in a third embodiment.
FIG. 22 is a chart for illustrating the transition of clock state based on the transition table in the third embodiment.

In view of the above, as the basis of creating such a transition table that the maximum current value at battery discharge does not become large, CPU clock frequency transition points as shown in FIG. 21 can be defined based on the CPU performance levels defined as CPU clock×CPU clock frequency duty factor. In this case, four kinds of CPU clocks, 33.3 MHz, 40 MHz, 50 MHz and 66.6 MHz are given.

With respect to the clock states as described in FIG. 21, a case of transition of clock state from lower to higher CPU performance level (in the case of transition from above to below in FIG. 21) will be described with reference to FIG. 22. Upon occurrence of an event that the CPU performance is insufficient in a clock state with a CPU clock frequency of 33.3 MHz and a duty factor of 100% (hereinafter, expressed as "33.3 MHz/100%"), a transition to the region of a clock frequency of 40 MHz is made on the basis of a standard of 40 MHz/83.5% that can offer a CPU performance level equivalent to 33.3 MHz/100%. Similarly, when the CPU performance level has fallen in an insufficient state with 40 MHz/100%, a transition to the region of a clock frequency of 50 MHz equivalent is made on the basis of a standard of 50 MHz/80% that can also offer an equivalent CPU performance level. In the case of an excessive CPU performance, a transition reverse to the above is performed.

From the above, the transition table may be set a s follows in order to avoid large maximum current values at battery discharge. That is, the steps (clock states) in the transition table may be set so that, upon occurrence of an insufficient CPU power with some clock frequency and the duty factor of 100%, a transition to a clock state of a higher clock frequency having an equivalent CPU power (where the duty factor is smaller than 100%) is made based on the frequency transition shown in FIG. 21 and, at the clock frequency after the transition, the clock state is shifted to a clock state of a one-step higher CPU performance level. FIG. 17, which has been shown as an example of the transition table in the foregoing second embodiment, also serves as an example of the transition table created in view of clock frequency transition points shown in FIG. 21.

As seen above, this embodiment features the constitution of the transition table, having limitations on the creation of the transition table as compared with the second embodiment, but is otherwise similar to the second embodiment. That is, the configuration of the computer system in this embodiment is as shown in FIG. 6 and the contents of the control software for CPU power control are as shown in the flow chart of FIG. 15.

Fourth Embodiment

The foregoing first through third embodiments are designed to reduce power consumption without causing the user discomfort, by optimizing the CPU power for required task through the operation (CPU power control operation) which comprises steps of detecting a CPU busy ratio and, based on the detecting result, changing the CPU clock frequency or changing the clock state i.e. a combination of a CPU clock frequency and a duty factor. However, depending on the circumstances under which the computer system is used or on the required task, there may be a demand that the computer be operated with a constant CPU power at all times without performing such a CPU power control operation. Therefore, this embodiment is equipped with a function of stopping and starting the CPU power control operation in the foregoing first through third embodiments. Since the CPU power control operation is fulfilled by the control software shown in FIG. 12 or 15, the function of stopping/starting the CPU power control operation can be fulfilled by controlling the execution/non-execution of the control software. Instruction of execution/non-execution of the control software may be performed by inputting an external control signal to the computer system based on, for example, user's input operation of a special key.

Figure 24:
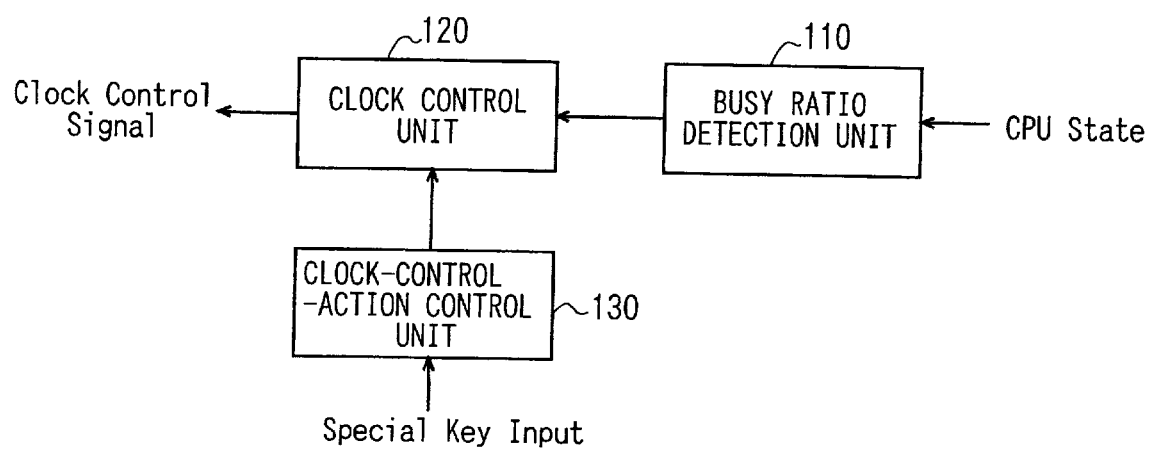
FIG. 24 is a functional block diagram showing a configuration for generating a clock control signal in the fourth embodiment.

FIG. 24 is a functional block diagram showing a configuration for generating a clock control signal such as a frequency control signal Sc in the fourth embodiment. The configuration shown in FIG. 24 comprises a busy ratio detection unit 110, a clock control unit 120 and a clock-control-action control unit 130, which are implemented by software. The busy ratio detection unit 110 checks the operational state of the CPU 20 and calculates the busy ratio Rb. Based on the busy ratio Rb, the clock control unit 120 generates a clock control signal for controlling the frequency or the frequency and duty factor of the system clock CLK. The clock-control-action control unit 130 controls the operation of the clock control unit 120, namely stops and starts its operation in response to the specified keying.

According to the fourth embodiment, stop/start of the CPU power control operation, i.e., shifts between operational state and non-operational state of the mechanism for dynamically changing the CPU power are enabled. However, it is desirable that the CPU clock state (CPU power) immediately after a shift from operating state to non-operating state of this mechanism can be arbitrarily set as required. For example, it is recommendable that, given a constitution that the clock states (steps) set in the transition table shown in FIG. 17 are displayed as a menu on the display unit of the computer system, the user is allowed to select one clock state by means of an external device such as a mouse, where when a stop of the CPU power control operation is specified by input of the special key or the like, the system clock frequency is controlled, or the CPU clock frequency and the duty factor are controlled, so that the selected clock state comes up. It is also possible that a clock state immediately before a shift is added as a selection candidate for the clock state immediately after the shift to the non-operating state of the mechanism, where when this clock state is selected, the clock state immediately before the shift is maintained after the shift to the non-operating state (i.e., the CPU power is maintained as it is). Moreover, as the case may be, it is also possible that the clock state immediately after the shift to the non-operating state of the mechanism is selectable from only the two clock states, one of the maximum CPU performance level and the other of the minimum CPU performance level in the transition table. Further, as the case may be, it may be arranged that the clock state immediately after the shift to the non-operating state of the mechanism is fixedly set to a specified clock state. This clock state to be fixedly set may be a clock state of the maximum CPU performance level, a clock state of the minimum CPU performance level, a clock state immediately before the shift or the like.

Fifth Embodiment

Figure 23:
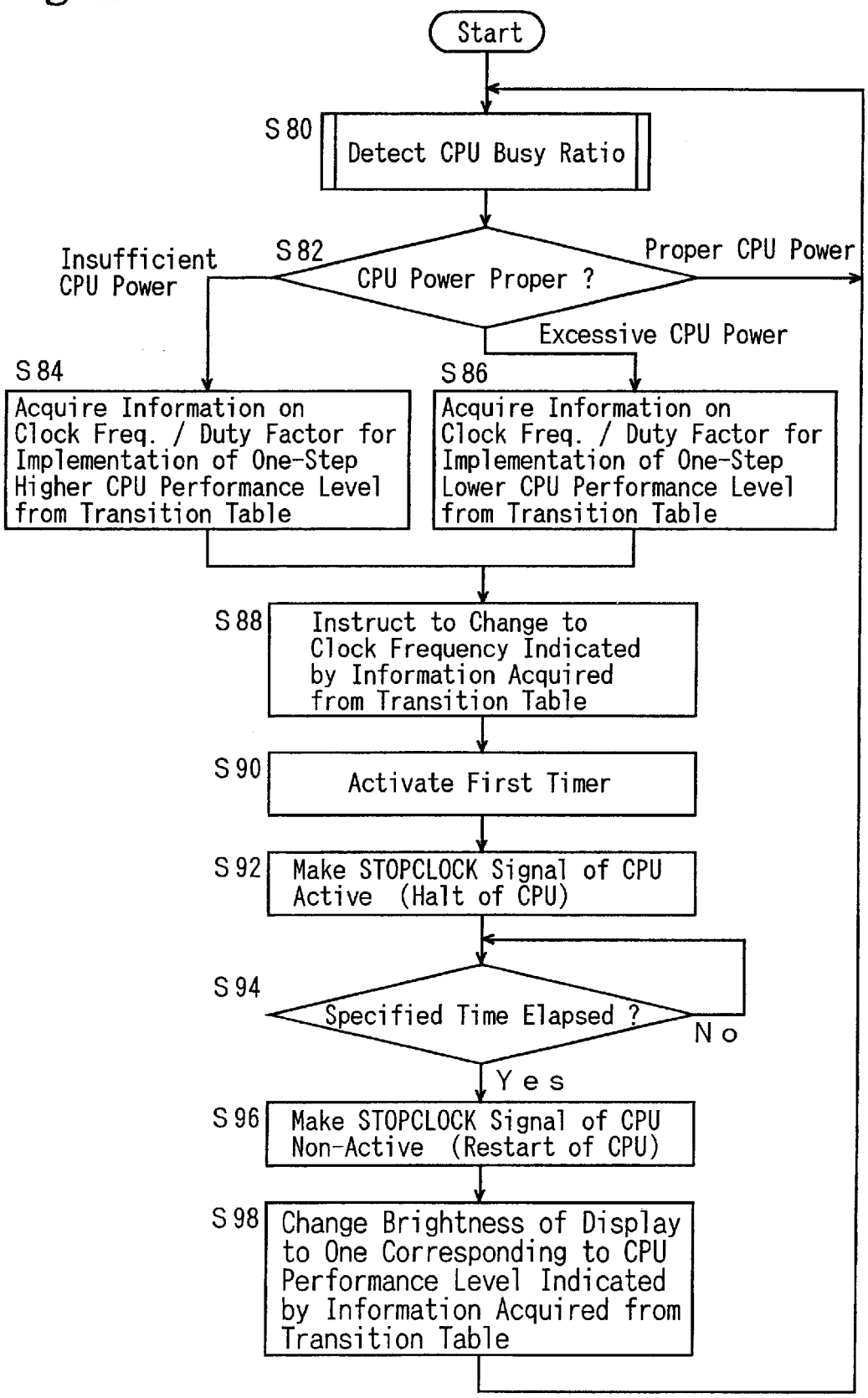
FIG. 23 is a flow chart showing the operation of controlling CPU power as well as brightness of the display unit in a fifth embodiment.

This embodiment is a computer system having a function of controlling the brightness of the display unit in linkage with the CPU power control function of the computer system in the foregoing first through fourth embodiments. In the case of the first embodiment, in which the CPU power is controlled by changing the system clock frequency, the brightness is controlled by giving a correlation of one-to-one correspondence between the system clock frequency and the brightness of the display unit. In the case of the second embodiment, the third embodiment or the like, in which the CPU power is controlled by CPU performance level, the brightness is controlled by giving a correlation of one-to-one correspondence between the CPU performance level and the brightness of the display unit. For this purpose, for example in the latter case, as in the flow chart shown in FIG. 23, step S98 is added to the flow chart of control software in the second embodiment or the like (FIG. 15), where if an insufficient or excessive CPU power is decided, the brightness of the display unit may be changed at this step S98 so as to match the CPU performance level shown by the information acquired by step S84 or step S86.

According to such an embodiment, as the demand for the CPU power of the computer system decreases due to less frequencies of use of the computer system by the user, the brightness of the display unit lowers. That is, this embodiment is designed to control the brightness of the display unit based on the concept that "less use degrades the function". Consequently, power consumption can be reduced without causing the user discomfort also by this brightness control.

What is claimed is:

1. An information processing apparatus comprising:
   a reference signal generator generating a system clock signal having a variable frequency;

a memory;

a central processing unit (CPU) for executing instructions stored in the memory, based on the system clock signal;

detection means for detecting a CPU operational state indicative of a load imposed on the CPU, the detection means detecting a CPU busy ratio, Tb/T, defined as a ratio of a sum, Tb, of the time periods during which the CPU is in a busy state during a reference time length, T, to the reference time length, the CPU busy ratio denoting the CPU operational state and indicating the load imposed on the CPU; and clock control means for controlling the frequency of the system clock signal so that the CPU operational state detected by the detection means falls within a specified CPU load range obtained by specifying a range of the CPU busy ratio, Tb/T.

2. The information processing apparatus as claimed in claim 1, wherein the clock control means comprises frequency control means for controlling the frequency of the system clock signal within a specified frequency range, the frequency control means controlling the frequency of the system clock signal to set the CPU operational state detected by the detection means within the specified CPU load range.

3. The information processing apparatus as claimed in claim 1, wherein the clock control means comprises frequency control means for raising and lowering the frequency of the system clock signal at a first rate, the frequency control means varying the frequency of the system clock signal to set the CPU operational state detected by the detection means within the specified CPU load range.

4. The information processing apparatus as claimed in claim 1, wherein the reference time length is less than 0.2 seconds.

5. The information processing apparatus as claimed in the claim 1, further comprising:

a display unit; and brightness control means for controlling brightness of the display unit in response to variation in the frequency of the system clock signal.

6. The information processing apparatus as claimed in claim 1, wherein the clock control means comprises frequency control means for varying the frequency of the system clock signal and decision means for deciding whether the busy ratio detected by the detection means is within the range of the busy ratio, Tb/T, corresponding to the specified CPU load range, the frequency control means changing the frequency of the system clock signal stepwise to shift the CPU busy ratio so the CPU load is in the specified CPU load range.

7. The information processing apparatus as claimed in claim 6, wherein a time per decision of the decision means, in response to a frequency varying rate is defined as a frequency variation per unit time, and the clock control means comprises timing control means for controlling a time period during which the frequency of the system clock signal changes between successive decisions of the decision means to set the time period to a specified time.

8. The information processing apparatus as claimed in claim 1, comprising operation control means for stopping and starting the clock control means in response to signals input externally, including a signal based on specified keying.

9. The information processing apparatus as claimed in claim 8, wherein the operation control means sets the frequency of the system clock signal immediately after a transition from an operational state of the clock control means to a non-operational state to achieve a maximum or minimum frequency among frequencies of the system clock signal generated by the reference signal generator, regardless of the frequency of the system clock signal before the transition.

10. The information processing apparatus as claimed in claim 9, comprising selection means for selecting from a maximum frequency and a minimum frequency among frequencies of the system clock signal generated by the reference signal generator, the operation control means setting the frequency of the system clock signal immediately after a transition from an operational state of the clock control means to a non-operational state, to a frequency selected by the selection means.

11. An information processing apparatus comprising:

a reference signal generator generating a system clock signal having a variable frequency;

a memory;

a central processing unit (CPU) for executing instructions stored in the memory, based on the system clock signal;

detection means for detecting a CPU operational state indicative of a load imposed on the CPU; and clock control means controlling the frequency of the system clock signal so that the CPU operational state detected by the detection means falls within a specified CPU load range and comprising frequency control means for setting a frequency variation per unit time utilizing a control signal input externally and for varying the frequency of the system clock signal according to the frequency variation, the frequency control means controlling the frequency of the system clock signal to set said CPU operational state detected by the detection means within the specified CPU load range.

12. An information processing apparatus comprising:

a reference signal generator generating a system clock signal having a variable frequency;

a memory;

a central processing unit (CPU) for executing instructions stored in the memory, based on the system clock signal;

detection means for detecting a CPU busy ratio, Tb/T, defined as a ratio of a sum, Tb, of time periods during which the CPU is in a busy state during a reference time length, T, to the reference time length, the CPU busy ratio denoting a CPU operational state and indicating a load imposed on the CPU;

clock control means for controlling a CPU clock signal derived from the system clock signal so that the busy ratio Tb/T detected by the detection means falls within a specified range indicative of a range of proper CPU load, the clock control means comprising:

frequency control means for selecting a frequency from a plurality of different frequencies and for setting the frequency of the CPU to a selected frequency, duty factor control means for selecting a duty factor from a plurality of duty factors and for setting the duty factor of the CPU clock signal having a time period during which no pulse exists, wherein the duty factor is defined as a ratio of a sum of time periods during which a pulse exists during a unit of time, to the unit of time, storage means for storing a table in which each element corresponds to different pairs of a frequency and a duty factor of the CPU, wherein each element is registered in order of increasing or decreasing CPU performance level defined as a product of the frequency and the duty factor of the CPU, and decision means for deciding whether the busy ratio detected by the detection means is within the specified range; and the frequency control means and the duty factor control means cooperatively change one step of the frequency and the duty factor of the CPU corresponding to a transition between adjacent elements in the table with the decision being made by the decision means, whereby the busy ratio, Tb/T, is shifted into the specified range.

13. The information processing apparatus as claimed in claim 12, wherein the clock control means sets the frequency control means and the duty factor control means to change the frequency and the duty factor of the CPU by multiple steps of the frequency and the duty factor corresponding to plural transitions between adjacent elements in the table.

14. The information processing apparatus as claimed in claim 12, wherein, when plural pairs of the frequency and the duty factor are present as a pair that gives identical CPU performance level, the table includes as an element a pair of the frequency and the duty factor corresponding to a lowest or a relatively low frequency among the plural frequencies of the plural pairs.

15. The information processing apparatus as claimed in claim 12, further comprising:

a display unit; and brightness control means for controlling brightness of the display unit in response to CPU performance level corresponding to the frequency and the duty factor of the CPU clock signal selected by the frequency control means and the duty factor control means.

16. The information processing apparatus as claimed in claim 12, comprising operational control means for stopping and starting the clock control means in response to signals input externally, including a signal based on specified keying.

17. The information processing apparatus as claimed in claim 16, wherein the operation control means sets a state of the CPU clock signal immediately after a transition from an operational state of the clock control means to a non-operational state to maintain the state of the CPU clock signal immediately before the transition.

18. The information processing apparatus as claimed in claim 12, comprising operation control means for stopping and starting the clock control means in response to signals input externally, including a signal based on specified keying, the operation control means setting the frequency and the duty factor of the CPU clock signal immediately after a transition from an operational state of the clock control means to a non-operational state, to a frequency and a duty factor corresponding to an element of a maximum or minimum CPU performance level among all elements in the table.

19. The information processing apparatus as claimed in claim 18, comprising selection means for selecting from an element of maximum CPU performance and an element of minimum CPU performance among all elements in the table, the operation control means setting the frequency and the duty factor of the CPU clock signal immediately after a transition from an operational state of the clock control means to a non-operational state, to the frequency and the duty factor corresponding to an element selected by the selection means.

* * * * *